(12) United States Patent
Kamei et al.

(10) Patent No.: US 6,826,472 B1
(45) Date of Patent: Nov. 30, 2004

(54) METHOD AND APPARATUS TO GENERATE DRIVING GUIDES

(75) Inventors: Asao Kamei, Menlo Park, CA (US); Edward J. Suranyi, Union City, CA (US)

(73) Assignee: Tele Atlas North America, Inc., Menlo Park, CA (US)

( * ) Notice: Subject to any disclaimer, the term of this patent is extended or adjusted under 35 U.S.C. 154(b) by 175 days.

(21) Appl. No.: 09/714,745

(22) Filed: Nov. 16, 2000

Related U.S. Application Data

(60) Provisional application No. 60/170,198, filed on Dec. 10, 1999.

(51) Int. Cl.$^7$ ............................................. G01C 21/00
(52) U.S. Cl. ...................... 701/202; 701/200; 73/178 R; 340/995.19; 340/995.24
(58) Field of Search ............................. 701/202, 200, 701/210, 211, 23, 36; 73/178 R; 340/995.14, 995.19, 995.24

(56) References Cited

U.S. PATENT DOCUMENTS

| | | | |
|---|---|---|---|
| 4,796,191 A | | 1/1989 | Honey et al. ................ 364/450 |
| 4,914,605 A | | 4/1990 | Loughmiller, Jr. et al. . 364/518 |
| 5,191,532 A | * | 3/1993 | Moroto et al. .............. 340/990 |
| 5,220,507 A | * | 6/1993 | Kirson ........................ 701/202 |
| 5,272,638 A | * | 12/1993 | Martin et al. ............... 340/990 |
| 5,550,538 A | * | 8/1996 | Fujii et al. ................... 340/990 |
| 5,559,707 A | * | 9/1996 | DeLorme et al. ........... 340/990 |
| 5,608,635 A | | 3/1997 | Tamai ....................... 364/449.3 |
| 5,638,280 A | * | 6/1997 | Nishimura et al. ......... 340/990 |
| 5,729,217 A | * | 3/1998 | Ito et al. ...................... 340/903 |
| 5,729,458 A | | 3/1998 | Poppen .................... 364/464.1 |
| 5,752,243 A | * | 5/1998 | Reiter et al. ................. 707/101 |
| 5,793,631 A | * | 8/1998 | Ito et al. ...................... 340/990 |
| 5,799,263 A | * | 8/1998 | Culbertson .................. 340/994 |
| 5,802,492 A | * | 9/1998 | DeLorme et al. ........... 340/990 |
| 5,819,201 A | * | 10/1998 | DeGraaf ................. 340/309.15 |
| 5,825,306 A | * | 10/1998 | Hiyokawa et al. .......... 340/988 |
| 5,848,373 A | * | 12/1998 | DeLorme et al. ........... 340/990 |
| 5,931,888 A | | 8/1999 | Hiyokawa .................... 701/208 |
| 5,944,768 A | * | 8/1999 | Ito et al. ...................... 340/990 |
| 5,948,040 A | * | 9/1999 | DeLorme et al. ........... 340/990 |
| 5,963,948 A | * | 10/1999 | Shilcrat ....................... 340/995 |
| 5,978,730 A | | 11/1999 | Poppen et al. .............. 701/202 |
| 6,016,485 A | * | 1/2000 | Amakawa et al. .......... 701/201 |
| 6,064,941 A | * | 5/2000 | Nimura et al. .............. 340/988 |
| 6,073,075 A | * | 6/2000 | Kondou et al. ............. 340/988 |
| 6,078,865 A | * | 6/2000 | Koyanagi .................... 340/988 |
| 6,088,636 A | * | 7/2000 | Chigumira et al. ......... 701/214 |
| 6,249,742 B1 | * | 6/2001 | Friederich et al. .......... 340/995 |
| 6,256,581 B1 | * | 7/2001 | Fujii et al. ................... 701/200 |
| 6,259,990 B1 | * | 7/2001 | Shojima et al. ........ 340/825.19 |
| 6,266,614 B1 | * | 7/2001 | Alumbaugh ................. 701/211 |
| 6,266,615 B1 | * | 7/2001 | Jin .............................. 340/995 |
| 6,278,928 B1 | * | 8/2001 | Aruga et al. .................. 701/65 |
| 6,278,938 B1 | * | 8/2001 | Alumbaugh ................. 701/208 |
| 6,298,303 B1 | * | 10/2001 | Khavakh et al. ............ 701/209 |
| 6,308,177 B1 | * | 10/2001 | Israni et al. ................. 340/990 |
| 6,314,364 B1 | * | 11/2001 | Nakamura ................... 340/995 |
| 6,321,158 B1 | * | 11/2001 | DeLorme et al. ........... 340/995 |
| 2004/0117109 A1 | * | 6/2004 | Kodani et al. .............. 701/200 |

* cited by examiner

Primary Examiner—Thomas G. Black
Assistant Examiner—Olga Hernandez
(74) Attorney, Agent, or Firm—Fliesler Meyer LLP

(57) ABSTRACT

A navigation device displays major routes and direction indications without a specific destination requirement. Where several possible destinations are presented, the device displays information for a destination at or when nearing decision points for traveling to the destination. Direction indicators can be presented on top of an appropriately scaled map having routes displayed which are integral to the indicators and directions. A destination displayed may be selected to retrieve detailed driving instructions to that specific destination. In one embodiment, the navigation device displays direction indications to major destinations, entrances, exits, and other important facilities in a "highway sign" fashion at major decision points.

134 Claims, 20 Drawing Sheets

Program Flow

Determine Origin

Determine Entrance/Exit Points

Determine Path

Report Results

| 1200 | 1250 |
|---|---|
| 101 South | ⇨ |
| 101 North | ⇨ |
| 280 South | ⇦ |
| 280 North | ⇦ |
| El Camino | ↕ N/S |

FIG. 12

| 1300 / 1305 | 1310 | 1320 |
|---|---|---|
| SFO (San Francisco) ✈ | ⇨ | 20 km (N) |
| San Francisco | ⇦⇨ | 28 km (N) |
| Fun Center (L) | ----- | East of 101 |
| Menlo Park | ----- | ----- |
| TEXACO Sign (L) | ----- | West of 101 |
| Sunnyvale | ⇨ | 13 km (S) |
| SJC (San Jose) ✈ | ⇨ | 35 km (S) |

FIG. 13

INTERSTATE 10

| 1400 | 1410 | 1412 | 1420 |
|---|---|---|---|
| Yuma | 90 mi. | ∧ | ☎ 🍴 🏠 ⛺ 🍽 ATM |
| El Centro | 180 mi. | ∧ | ☎ ⛺ ▨ ▨ |
| Alpine | 220 mi. | ∧ | ⛺ 🍴 🍽 ATM |
| San Diego | 290 mi. | ∧ | 🏠 🍴 ▨ |
| Gila Bend | 40 mi. | ∨ | ☎ ▨ |
| Phoenix | 125 mi. | ∨ | ☎ 🍴 🏠 ⛺ 🍽 ATM |

HIGHWAY 101

| Exit / City | Distance To / From | Points of Interest |
|---|---|---|
| University Ave. (Palo Alto) | 1 mi. ∧ | Stanford University |
| Willow (Dumbarton Bridge to Fremont) | 2 mi. ∧ | San Francisco Bay (South) |
| Marsh | 3 mi. ∧ | — — — — — — — — — |
| Whipple (Redwood City) | 4 mi. ∧ | Fun Center |
| SFO | 12 mi. ∧ | — — — — — — — — — |
| San Francisco | 18 mi. ∧ | — — — — — — — — — |
| San Antorro Ave. | 1 mi. ∧ | — — — — — — — — — |
| San Jose | 12 mi. ∧ | — — — — — — — — — |

FIG. 14B

METHOD AND APPARATUS TO GENERATE DRIVING GUIDES

This application claims the benefit of prior filed and co-pending United States Provisional Application entitled "Method and Apparatus to Generate Driving Guides," Asao Kamei, Ser. No. of 60/170,198, filed on Dec. 10, 1999, incorporated herein by reference.

BACKGROUND OF THE INVENTION

1. Field of the Invention

This invention relates to a method and apparatus for generating routing information, including the generation of driving guides for display to a user.

2. Discussion of the Background

Navigational Aids built upon small portable, and powerful computers and specialized electronics have revolutionized the concept of maps and methods of finding routes from an origin to a specific destination. One recent breakthrough fueling this revolution is illustrated in FIG. 1, the concept of an automobile based map and direction finding system 100, as described in Loughmiller, Jr. et al., U.S. Pat. No. 4,914,605, issued Apr. 3, 1990, entitled "Apparatus and Method for Displaying a Map," incorporated herein by reference, in its entirety. Additional methods and navigation functionality are also described in Honey et al., U.S. Pat. No. 4,796,191, issued Jan. 03, 1989, entitled "VEHICLE NAVIGATION SYSTEM AND METHOD," also incorporated herein by reference, in its entirety.

Such systems provide a map display 110 that is properly oriented so as to be easily read by a driver and provide navigational aid. Modern systems are end-point oriented and can provide a path to a specific destination. They usually include an option for a map, the ability to select a zoom factor, list turn by turn directions, and other options. Other specialized features of such systems include the ability to change a display of an area surrounding the driver as a location of the driver progresses, display a desired destination entered by the driver, and provide a symbol on the display indicating the current location of the driver.

A typical system involving maps with routes utilize a mathematical structure called a directed graph. A directed graph consists of a set of points called nodes, along with a set of connections called "links."

FIG. 2A shows an exemplar directed graph which shows eastbound oneway street 50 and two-way street 52, both intersecting with two-way street 54. Street 50 intersects with street 54 at intersection 60. Street 52 intersects with street 54 at intersection 70. At intersection 60 are two nodes, 62 and 64. The circle represents where the node is located and the tail represents where a traveler would come from to reach that node.

In FIG. 2A, The node symbol is displaced from the actual intersection for purposes of visibility. Links represent a path between nodes. For example, from node 64 a traveler can make a right turn at intersection 60 to enter road 54 or can proceed straight on road 50. Link 86 represents travel starting from intersection 60 on road 50 facing east, making a right turn at intersection 60 and proceeding south on road 54. Thus, link 86 connects node 64 to node 72.

FIG. 2A only shows links drawn for nodes 62 and 64. If links are drawn for all nodes, the directed graph would become too crowded and would be difficult to read. Thus, the directed graph is simplified and redrawn as in FIG. 2B.

The directed graph of FIG. 2B is used to symbolically represent the data structure stored for a map. A similar system may be utilized in any of the prior navigation systems. These systems do not actually store an image of a directed graph. Rather, a data structure representing the graph (or similar system) is stored. Each entry in the data structure represents a node. For each node, the data structure stores the location of the node (e.g., latitude and longitude), a list of neighboring nodes (nodes which can be traveled to via one link) and the various costs associated with getting to the neighboring nodes. The nodes and links are maintained in a database which is then searched to find routes in which to navigate the graph or network.

One general problem with navigation systems is that of how to search or determine the proper navigational route from the possible choices. This problem is particularly difficult when presented with a large network having many possible routes within which to navigate. However, once a network is known, systems for determining routes are also known. One example would be an application of Dijkstra's Search Algorithm (E. W. Dijkstra, "A Note on Two Problems in Connexion with Graphs," Numerische Mathematik, Vol. 1, pp. 269–271 [1959]) to the directed graph.

Poppen et al., U.S. patent application Ser. No. 08/802,733, filed Feb. 20,1997, entitled "CACHING FOR PATHFINDING," incorporated herein by reference, in its entirety, teaches a system for determining routes for a directed graph. This and other route finding systems look at a network as a set of individual paths and piece together an acceptable route by iteratively and intelligently selecting and comparing possible routes.

One method for increasing the efficiency of the iterative route determination systems is to utilize a system of tiles representing an area (network) to be navigated. Such a system is described in Amakawa et al., U.S. Pat. 6,016,485, Ser. No. 09/023,504, filed Feb. 13, 1998, entitled "A SYSTEM FOR PATHFINDING," incorporated herein by reference, in its entirety. Briefly described, the network is broken into tiles having plural entrance and exit nodes, which are then utilized as entrance and exit points to the tiles. Route planning within a tile does not change, but the routes between tiles are well known and quickly calculated. Thus navigation or route planning need only be calculated for travel within an origin tile and a destination tile.

Determining the cost of a particular route is also important to a successful navigation aid. Such cost may be measured in $ (tolls), gasoline, or time, for example. U.S. Pat. No. 5,729,458, entitled "COST ZONES," incorporated herein by reference, teaches about the use of costs.

The above-discussed technical innovations have led to modern mapping and navigation systems for automotive, marine, and other transport systems, that are cost efficient and provide quality, needed information to users. The above technologies are also applicable to computing networks and communications systems that also require route planning (telecom applications, static applications, Internet applications, PC applications, etc, for example).

However, in today's fast paced environment many people do not necessarily have the time to learn new navigation systems. Even once learned, inputting starting locations and destinations can be time consuming and cumbersome. Even a simple mechanism for inputting a destination would necessarily divert some of a drivers attention from the task at hand (driving, for example). Sometimes the starting location and/or destination is not precisely known at the beginning of a trip.

Current routing, guidance, and map display systems only provide limited help to a driver who does not enter a destination. Furthermore, large amounts of real time traffic information is currently available via electronic communication and other means that provides relevant information that a driver would want to consider in determining a selected route. Such information is generally too abundant to be effectively displayed for consideration by the driver.

SUMMARY OF THE INVENTION

A navigation device would be very useful, and alleviate many of the problems in the prior art, if driving directions would be presented without a requirement of a destination. Roughly described, the present invention provides a navigational device that computes and displays driving directions and/or information to any of general destinations, including, but not limited to, any of the following: major cities, landmarks, streets, routes, waypoints, waypaths (such as a highway), and other general destinations without a specific destination or origin input requirement from a user.

The invention is particularly useful in a case where there are at least two possible destinations (and in general several). The invention gives a user information necessary (and at the appropriate time) to make decisions (choices between alternative general destinations). For example, suppose a user has agreed to take his sister-in-law to the airport. She lives in San Jose and the user knows how to get to her house but doesn't know much about the overall road network in her neighborhood. The user arrives at the house and finds out that they need to go to Oakland airport, not San Jose airport—and they are late. The user proceeds in his/her car knowing that Oakland airport is near Oakland.

The invention tells the user how to get to Rte. 101 and Rte. 280 and the user knows that Rte. 101 will have highway connections to the East Bay, so the user heads toward Rte. 101. At Rte. 101, the invention tells the user that North is to SF and South is to Gilroy, and the user makes the decision to go north. Next, the invention tells the user that the user is approaching Rte. I-880 which proceeds North to Fremont, Hayward and Oakland or West to Los Gatos and Santa Cruz, or that the user can stay on Rte. 101 to Sunnyvale and San Francisco. This is enough information for the user to select Rte. 880, North. As the user gets reasonably close to Oakland airport, the invention presents a sign that tells the user how to exit to Oakland Airport. As the user takes that exit, the user is provided choices to other nearby points, but as long as the user keeps moving towards the Airport that choice is always in the list. Thus, the user gets to the airport without ever entering a destination and without ever selecting the airport.

By providing directions or other navigational aids to general destinations (rather than a specific address), the invention solves most practical navigation problems. The invention allows a user to get started towards a general destination (north on Rte. 101, for example), allowing the user to determine more specific directions (perhaps to a specific address) at a later time. Thus, instead of focusing on an enumerated endpoint (specific) destination, the present invention facilitates navigation, by focusing on an area near or encompassing a location where the user wants to travel. It is often the case that a driver knows where the end destination is but is missing knowledge about how to get, say, to the nearest highway entrance. The present invention provides driving information to such key waypoints without the need for any operator input.

In one embodiment, the present invention provides a device capable of providing routing information without user provided origin or destination requirements. In addition, simplified navigation directions and route information are automatically provided at relevant decision points. Such routing information may take the form of an in-car electronic sign that points in a relevant direction toward a major route, waypath, waypoint, city, landmark, previous destination, or other point, thoroughfare, etc. Routing without a user-specified origin or destination can be accomplished in similar fashion, and can be used to calculate various different routes toward a point of interest, such as a retail establishment. In one embodiment, an origin or a destination is provided, but not both.

In another embodiment, the present invention considers all available real time and other traffic information when providing the automatically generated driving guides.

In yet another embodiment, the present invention is a navigation device configured to display navigation directions from an origin (and updating as the origin changes position) without a destination requirement. The navigation directions may comprise a listing of routes and an indication of which direction the routes are from the origin. The indication includes an arrow pointing from the origin in a direction toward the route or other general destination.

The navigation device may be realized in a device comprised of a display mechanism, a computing unit connected to the display mechanism and configured to compute and provide navigation directions to the display mechanism without a destination requirement, including, an entrance/exit point module configured to determine a set of entrance and exit points based on predetermined selection factors, and a directions module configured to determine said navigation directions from the origin to each entrance and exit point.

The present invention can be implemented using software, hardware, or a combination of software and hardware. When all or portions of the present invention are implemented in software, that software can reside on a processor readable storage medium (media). Examples of appropriate processor readable storage medium (media) include a floppy disk, hard disk, CD ROM, memory IC, DVD, minidisc, etc. When the system includes hardware, the hardware may include an output device (e.g. a monitor, touch screen, telephone, speaker or printer), an input device (e.g. a keyboard, pointing device, touch screen, and/or a microphone), a processor in communication with the output device and processor readable storage medium in communication with the processor. The processor readable storage medium stores code capable of programming the processor to perform the steps to implement the present invention. The process of the present invention can also be implemented on a web page on the Internet or on a server that can be accessed over wired or wireless telephone lines, or other communications mediums.

The present invention includes a method of navigating, comprising the steps of computing navigation directions from an origin without specific destination requirements, and displaying the navigation directions. In one embodiment, the step of displaying includes the steps of listing a set of general locations and placing at least one directional indication to correspond with each location listed.

The present invention may also be utilized in a reverse manner to that described above, i.e., to find directions to a destination without an origin requirement. Such a system would calculate navigation or driving directions to the destination from each of major areas, cities, routes or arteries in a direction toward the destination. In one alternative, the system would have a set of stored potential origins and directions would be generated from a set of said potential origins that are closest to the current location.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12 is a second example output display of a navigational device set up for freeways and major routes with directional indications according to the present invention;

FIG. 13 is a third example output display of a navigational device set up for major cities and airports with directional indications according to the present invention;

FIG. 14A is a fourth example output display of a navigational device set up for freeway exit points with directional and other facility indicators according to the present invention;

FIG. 14B is another example of an output display including points of interest;

DESCRIPTION OF THE PREFERRED EMBODIMENTS

Figure 1:
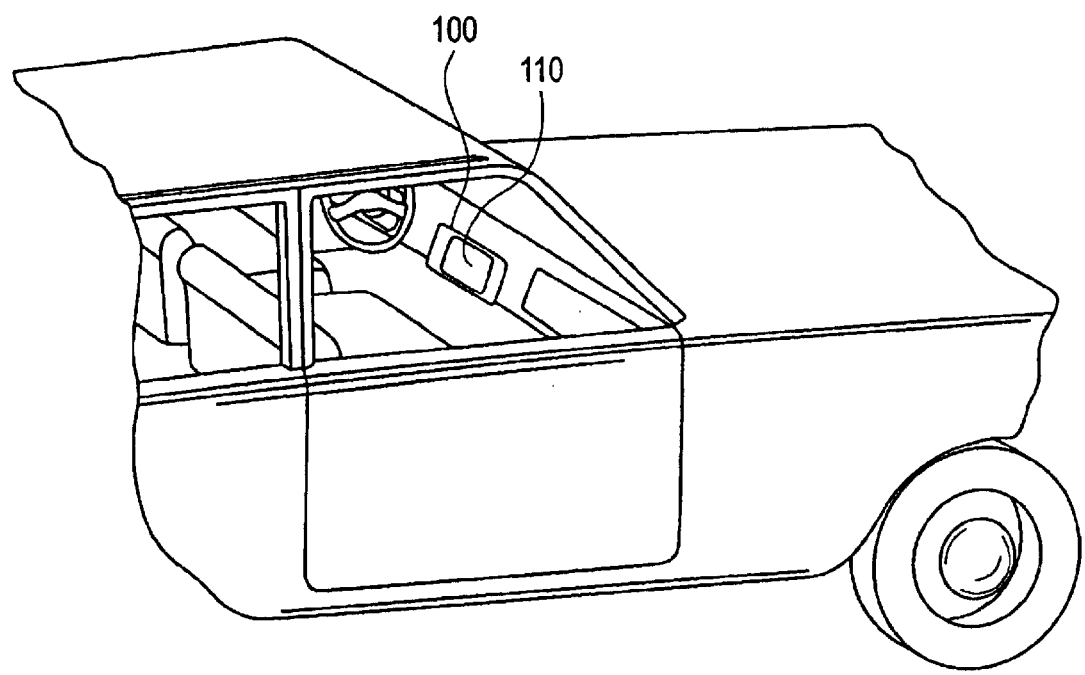
FIG. 1 is an illustration of a conventional navigational device fitted inside an automobile.
Figure 2A:
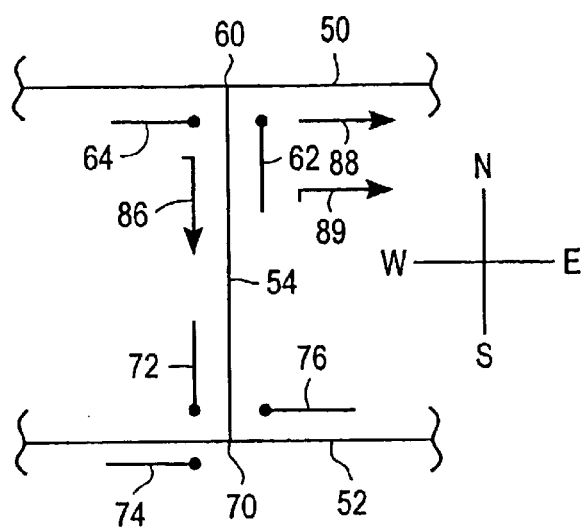
FIG. 2A is an example of a conventional directed graph illustrating nodes and links.
Figure 2B:
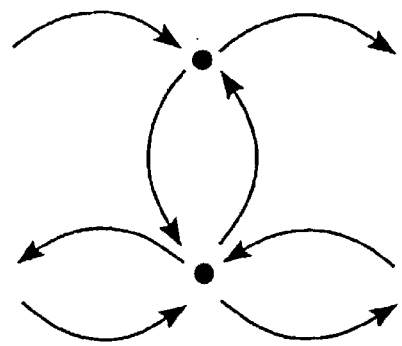
FIG. 2B is a simplified directed graph used to symbolically represent a data structure used for storing a map.
Figure 3:
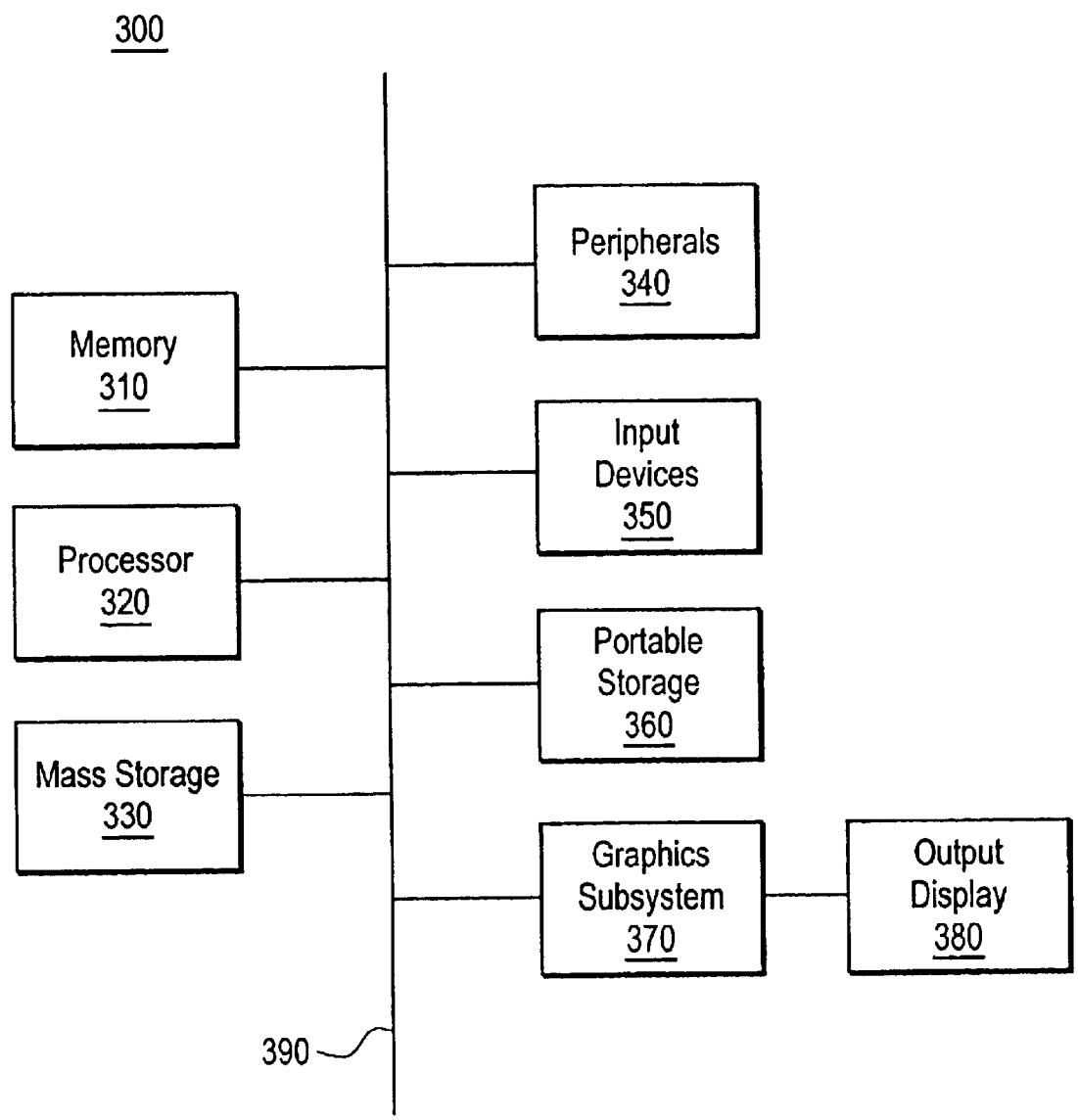
FIG. 3 is a block diagram illustrating an example computer device containing software programs for displaying navigational information to a user.

Referring again to the drawings, wherein like reference numerals designate identical or corresponding parts throughout the several views, and more particularly to FIG. 3, thereof, there is illustrated a high level block diagram of a general purpose computer system in which the present invention may be implemented. Computer system 300 contains main memory 310 and processor unit 320. Processor unit 320 may contain a single microprocessor, or may contain a plurality of microprocessors for configuring the computer system 300 as a multi-processor system. Main memory 310 stores, in part, instructions and data for execution by processor unit 320. If the method for automatically generating driving guides is wholly or partially implemented in software, main memory 310 stores the executable code when in operation. Main memory 310 may be of any type of memory, including, but not limited to banks of dynamic random access memory (DRAM), as well as high speed cache memory.

Computer system 300 further includes a mass storage device 330, peripheral device(s) 340 (which may include any of navigational or communications devices as required by the disclosure presented herein), input device(s) 350, portable storage medium drive(s) 360, a graphics subsystem 370 and an output display 380. For purposes of simplicity, the components in computer system 300 are shown in FIG. 3 as being connected via a single bus 390. However, computer system 300 may be connected through one or more data transport means. For example, processor unit 320 and main memory 310 may be connected via a local microprocessor bus, and the mass storage device 330, peripheral device(s) 340, portable storage medium drive(s) 360, graphics subsystem 370 may be connected via one or more input/output (I/O) buses. Mass storage device 330, which may be implemented with a magnetic disk drive, optical disk drive, ROM, flash, or other non-volatile storage devices is configured for storing data and instructions for use by processor unit 320. In one embodiment, mass storage device 330 stores the software for determining a path for purposes of loading to main memory 310.

Portable storage medium drive 360 operates in conjunction with a portable non-volatile storage medium, such as a floppy disk, to input and output data and code to and from computer system 300. In one embodiment, the software for automatically generating driving guides is stored on such a portable medium, and is input to the computer system 300 via the portable storage medium drive 360. Peripheral device(s) 340 may include any type of computer support device, such as an input/output (I/O) interface, to add additional functionality to the computer system 300. For example, peripheral device(s) 340 may include a network interface card for interfacing computer system 300 to a network, a modem, or other devices including wired and wireless systems, etc.

Input device(s) 350 provide a portion of the user interface for a user of computer system 300. Input device(s) 350 may include an alpha-numeric keypad for inputting alpha-numeric and other key information, a touch screen, microphone for speech recognition, message taking, etc., or a cursor control device, such as a mouse, a trackball, stylus, or cursor direction keys.

In order to display textual and graphical information, computer system 300 contains graphics subsystem 370 and the output display 380. Output display 380 may include a cathode ray tube (CRT) display, liquid crystal display (LCD) or other suitable display device. Graphics subsystem 370 receives textual and graphical information, and processes the information for output to output display 380. Output display 380 can be used to report the results of automatic driving guide generation. Output Display 380 also includes a voice or audio out for audio output of driving and other related information (such as help instructions, etc.).

Figure 4:
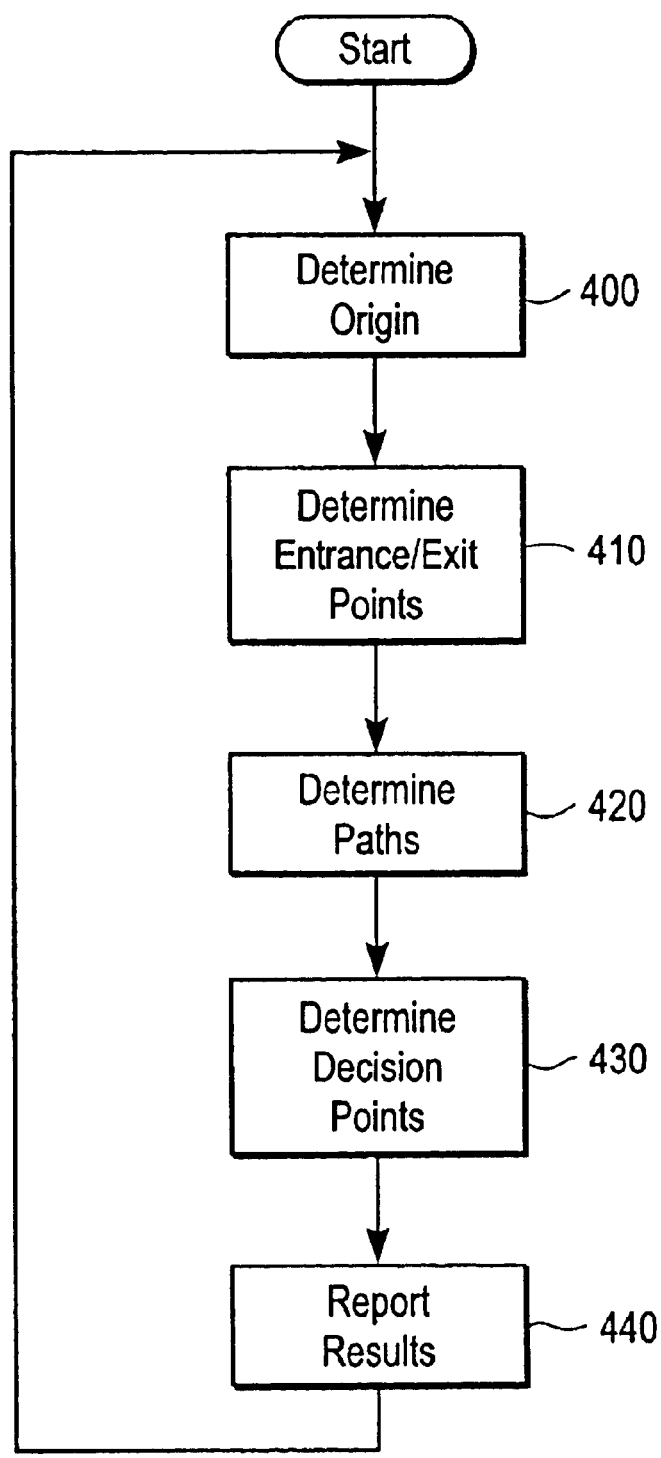
FIG. 4 is a flow diagram illustrating a high level program flow of one embodiment of the present invention.

FIG. 4 illustrates a program flow of one embodiment of the present invention. At step 400, an origin is determined. The origin can be determined by any means or methods, including retrieval of user input, reading a file having an origin stored in it, or receiving (reading or accepting) an origin location from a position determining (positioning)

device such as a vehicle navigation unit (similar to the one discussed in U.S. Pat. No. 4,796,191, for example), a Global Positioning System (GPS), Satellite Navigation System (SatNav, for example), LORAN, Automatic Direction Finder (ADF), cell phone locating technology, or other positioning devices. The positioning device is configured to automatically generate a fix or position upon an inquiry step from a main processor (see FIG. 5).

Alternatively, the positioning device is configured to automatically update (store in a file or provide a readable register, for example) a position or fix generated at a prescribed interval (every 1 second or every 10 feet of travel, for example). Therefore, step 400 may also include a substep of storing an origin location, which is then utilized by the remaining steps described below.

At step 410, entrance and exit points are determined. The entrance and exit points are determined within a predetermined cost or other criteria relative to the origin determined in step 400. For example, a default criteria may be set to determine all entrance and exit points within a 5, 25, or 100 mile radius of the origin. Alternatively, criteria may be specified by a user or otherwise set as a default criteria. For example, finding entrance and exit points relative to any cities having greater than 100,000 in population, or cities with major airports.

In another embodiment, destinations such as cities and towns are identified based on a sliding scale of distance and a likelihood factor. For example, a medium-sized city is a likely destination, unless it is a long distance from the user. A larger city would remain a likely destination even at greater distances. As an example, a sliding scale could be implemented to identify cities as destinations if the population is more than 50,000 for cities less than 20 miles away and cities of greater than 500,000 population up to distances of 50 miles. A sliding scale of different populations, distances and other criteria may also be implemented.

Other than cities or populations, likely destinations may also be based on criteria such as seating capacity for sports complexes, whether a ball park hosts a major league or minor league team, or any other factors. As any of the likely destinations get closer, they become more likely and take greater precedence in destination calculations performed. Once past a particular destination, it's likelihood would drop considerable, but not necessarily be eliminated, as a destination candidate. Thus, calculated destinations are calculated in context, based on a proximity of the destination to the user or origin, and based on the importance or other factors relevant to the general destination itself.

Entrance and exit points (entrance/exit points) include entrances and exits between generalized areas or other regions (tiles, for example). For purposes of this discussion, entrance and exit points may include entrances and exits to major highways or any routes which are normally a part of travel between larger generalized areas, such as cities or tiles. For example, travel from San Jose to San Francisco would generally include an entrance and exit to and from either one of highways 101 or 280. In this example, the freeway entrance points are general destinations, or waypoints (to waypaths), which comprise entrance points to networks (freeways) where a driver is able to get his/her bearings.

In addition, a destination, or location which is a likely destination of a user, or a point of interest that a user may want to visit while en route to a destination may also be determined in step 410 (Fun Center of FIG. 13, for example). Destinations may include, for example, any of gas stations, repair facilities, hospitals, banks, ATM machines, shopping malls, grocery stores, convenience stores, other store types, restaurants, highway entrances and exits, cities, parking lots, mass transit stations, campgrounds, public restrooms, government buildings, police stations, call boxes, public telephones, schools, libraries, points of interest, tourist attractions, stadiums, or any other type of classifiable location.

In one embodiment, a user inputs a class of destinations. Any destinations matching the input class are displayed or directions are provided to the destination(s) matching the class. Various search criteria may also be entered (within a 5 mile radius, for example).

In one embodiment, an additional step of interrogating a user profile is performed. The user profile identifies what types of destinations and/or landmarks are important or more useful to the individual user. The profile information is then utilized to determine which of the destinations or other landmarks are used to describe any routes presented to the user. For example, a mechanism according to the present invention would include a user profile device that allows the user to set cities as more important than landmarks, or may put gas stations within 1 mile as high priority and banks as low priority. A profile function would allow a profile to be created, edited, saved, and set as either active or inactive. When activated, information from the user profile is utilized as a resource for making intelligent decisions in defining the points for any potential destinations. In one embodiment, even if the user has selected a specific destination, the process of determining important general destinations may continue and provide the user with options (gas stations, or other intermediary destinations, for example).

In one embodiment, the entrance/exit points are general destinations retrieved from a database. The retrieved destinations are then prioritized based on data making any of the destinations more or less likely to be a destination (endpoint, waypoint, waypath, etc.) of a user. A predetermined number of the highest priority destinations are then displayed (the highest 3, for example). A minimum number of destinations may also be displayed. A similar process may be performed for determining which or how many landmarks are displayed on any maps or provided with any navigation instructions requested.

The priority of destinations and/or landmarks may be based on landmark filters that assign a value to landmarks based on predetermined criteria; distance of said user from a general destination; metrics, including at least one of capacity of the general destination, popularity of the general destination, size of the general destination, and other metrics describing the general destinations; history of past travels of said user to the same or similar types of general destinations; and contact listings and other data stored connecting the user to each general destination.

For example, destinations, such as ball parks that host professional sports teams or have large seating capacities, would be higher priority than those that have low seating capacities or host minor league teams. Past travel would also indicate a more likely destination, boosting it's priority. If a user often travels to convention centers, any convention centers retrieved from the destinations database would be of higher priority.

Contact listings can be of any form of data that identifies a more likely potential destination. For example, a contacts list maintained in a personal information organizer (PIM), an Accounts listing, recent phone calls list, and bookmarks saved on an Internet browser (e.g., http://Hwww.ibm.com in a browser bookmark would add importance, or priority, to destinations associated with IBM® Corp. (computer company), or, an address associated with a recent phone call, from a cell phone or PIM list, would boost the priority of destination linked to that address).

In one embodiment a device according to the present invention includes a port such that a notebook or handheld computing device, cell phone, or other storage device containing the relevant data (contacts, etc) listed above can interface with the invention and provide criteria (or profile information) and data for determining destination priorities.

At step 420, a path is determined between the origin and each of the selected entrance/exit points, and/or destinations determined in step 410. Any method for determining a path may be utilized including the above described method for pathfinding (see U.S. patent application Ser. No. 09/023,504, and Dijkstra's Algorithm, etc., for example). A cost function will generally be applied such that any routes being too expensive or beyond other predetermined factors (time, or milage, for example) will be discarded.

An automobile driver inherently uses priorities anytime a navigation between cities is performed. Starting in a residential neighborhood, for example, the driver will navigate residential roads to traverse to a major road such as a collector or arterial road. The user will then navigate through major roads to find a highway. The path will continue to be determined on highways until the closest highway exit to the destination is found. At that point, the user will then navigate through major roads to get as close as possible to the destination. Finally, the user will find a path from the closest point on a major road to the destination (using residential roads, for example). Thus, one priority level could be the residential roads, a second priority could be the major roads (including collectors and arterials, for example) and a third priority could be the highways. At one point during the pathfinding process the user is navigating through residential roads. At a second point the user is only navigating through major roads and/or highways. At a third point the user is only navigating through highways, and so on. This process is more efficient because if the user looked through all roads at all times, there would be too much data to consider and the path is not likely to be the most efficient path.

In order to efficiently find a useful path, a pathfinding system will also use priority levels. Various pathfinding systems divide the different types of roads into different levels. A system may use any number of priority levels, and whether the system uses three levels, four levels, five levels, six levels, etc., it is not necessarily important to the present discussion. Table 1 provides an example of a system that divides the roads into six priority levels.

TABLE 1

| Type of Road | Priority |
| --- | --- |
| alley | 0 |
| residential | 1 |
| collector | 2 |
| arterial | 3 |
| less important highway | 4 |
| important highway | 5 |

As can be seen, Table 1 divides the different roads into six types of roads: alleys, residential roads, collector roads, arterial roads, less important highways and more important highways. Each type of road is assigned a priority. In one pathfinding system, when the system is determining a path from an origin to a destination, the system will begin by performing a pathfinding exploration from the origin and destination simultaneously, considering priority one and above roads.

At step 430, decision points on each of the paths determined are identified (also referred herein to as guidance points). Guidance points/decision points are points on the paths determined at which paths branch and at which point drivers will necessarily need or it would be helpful to have directions or guidance indicators in order to continue on a route toward the destination (or, alternatively, points where selection among several choices of destinations may be made by the user). Although many criteria may be utilized to determine guidance points, it is envisioned that, in automobile navigation systems, that, at a minimum, major intersections, or intersections leading to a major intersection, highway or route (including entrance and exit points as described above) would have a decision point or decision region associated with it (a decision point or decision region referring to an area where the guidance, directional indicators, or directions of the present invention would, at a minimum, be displayed).

At step 440, the results of the determining entrance/exit points, path finding, and decision points are displayed. A number of displays may be provided, for example, the display may be embodied as a map having directional indications superimposed thereon, a list of destinations with an indication, a text based set of driving directions, or an audio directional indicator ("Turn right at Whipple Avenue (for San Francisco)" for example). In one embodiment, step 440, includes steps of determining a scale of a map which is included in the results (or upon which the results are reported). In addition, step 440 may include steps to determine the most relevant points or locations to be included in the reported results (most relevant points of interest, landmarks, or services, for example).

The process is repeated at a predetermined interval based on time, distance or any other criteria. The loopback arrow of FIG. 4 illustrates one possible repeat scenario. Alternatively, a timing mechanism or a positioning device may be interrogated to determine a change in position triggering the loopback. As will be appreciated by those skilled in the art, in light of the present disclosure, many different variations of flow structures may be derived from the flow diagrams presented herein, each of which may be implemented using a wide array of programming techniques.

Figure 5:
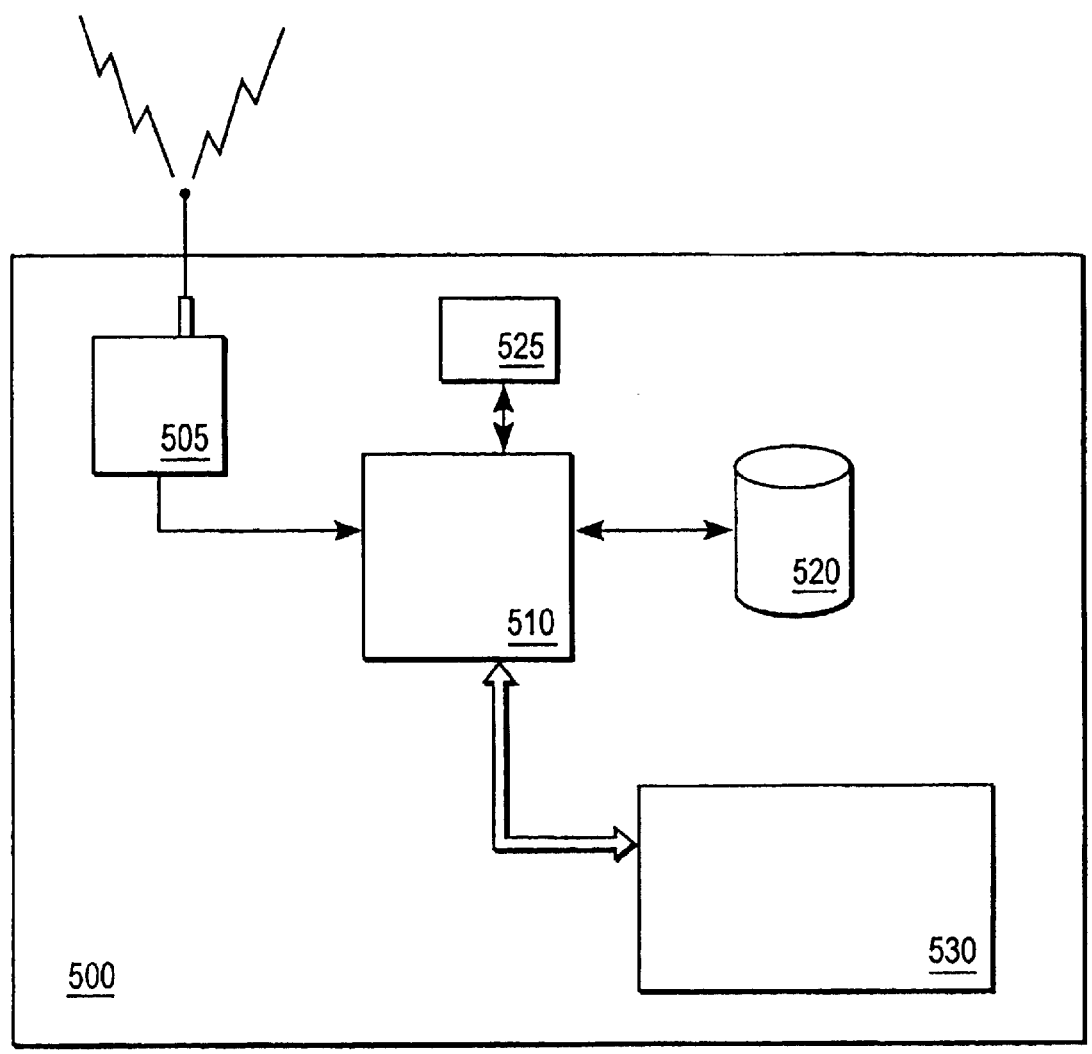
FIG. 5 is a block diagram illustrating an example arrangement of hardware devices configured to perform the processes of the present invention.

FIG. 5 illustrates an arrangement of hardware devices 500 (device 500) configured to perform the processes of the present invention including the embodiments discussed with reference to FIG. 4. A position locating device 505 (Vehicle Navigation System, GPS, Sat Nav, Loran, etc.) receives locating signals from one or more sources. The position locating device determines a fix or position (origin) of the device 500 (or alternatively a location of position locating device 505, if different from the entire device 500) and reports that fix or position to a processing device 510.

The position locating device 505, while shown as an automatic position locating device (GPS, Sat Nav, Loran, etc.) may also be embodied in many other forms, for example, a device for reading a file having a position stored therein, a prompt displayed on a computer screen in which a user enters a position (which may be sent to the display device from a remote server or across an Internet connection as discussed below), or a communication device that communicates with an external device for retrieving a position location that is either input or stored thereon. The origin reported by the position locating device 505 may include any of the position and/or course of which the position locating device is currently proceeding (for example, when the entire device 500 is located in an automobile, the origin may include information to indicate that the vehicle is proceeding south on Highway 101).

Using the position provided by the position locating device 505, processor 510 then queries the database 520 to retrieve data corresponding to an area surrounding the origin reported by position locating device 505. Processor 510 includes modules (software, firmware, or hardcoded electronics) for determining entrance/exit points, determining a path, determining decision points, and reporting results via display 530 (or other means). Once the data are retrieved from database 520, entrance/exit points are determined via an algorithm that selects the important points relative to the origin. A memory 525 is utilized to store programs and data utilized by processor 510.

In one embodiment, the position locating device 505 is an automatic position locating and course finding device that allows an origin position to be read and a course determined from outputs of the automatic position locating device 505. In this embodiment, the processor 510, performs the steps as shown in FIG. 6 to determine an origin and fill in a course object which is utilized in determining entrance/exit points (step 410), determining a path (step 420)(directions finding), determining decision points (step 430), and reporting results (step 440).

As will be appreciated by those skilled in the art, in light of the present disclosure, the hardware configuration of FIG. 5 can be re-arranged such that various of the disclosed components are consolidated into a single device or embodied in varied sets of microelectronics or combinations of hardware and software. For example, the processor 510 may include a built-in position locating device.

Figure 6:
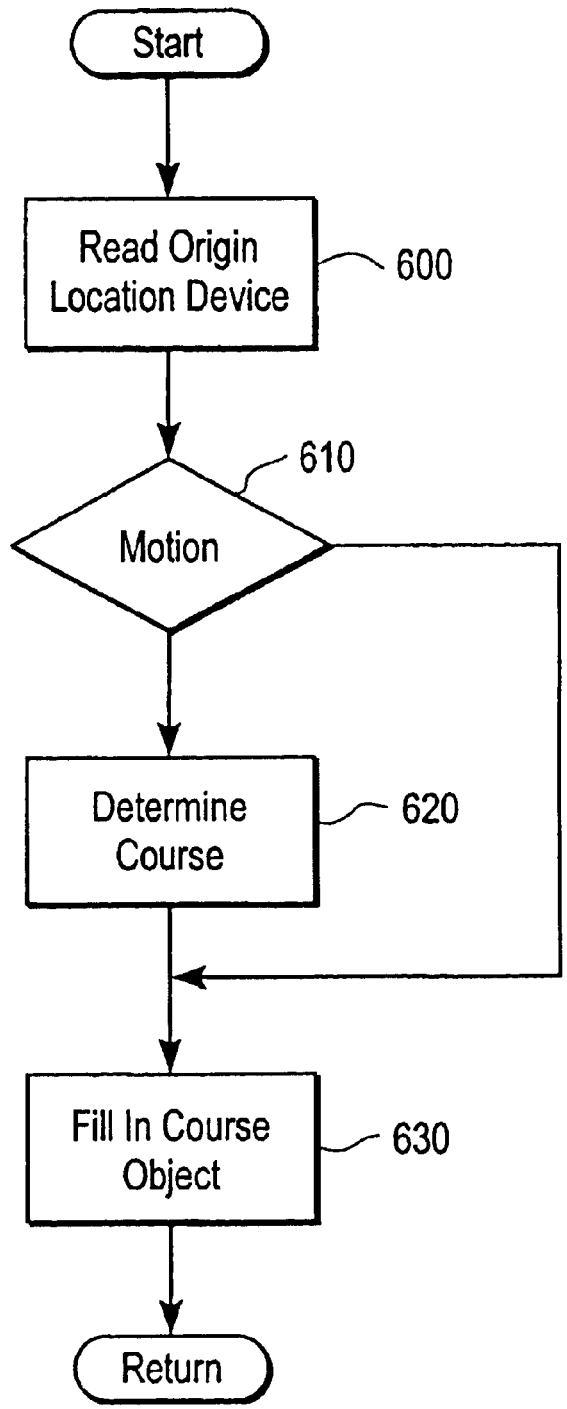
FIG. 6 is a flow diagram illustrating steps to determine an origin and fill in a course object utilized in determining entrance/exit points in one embodiment of the present invention.

In FIG. 6, at step 600, the position locating device is read by processor 510 to determine a location. At step 620, if the automatic position locating device 505 is in motion (step 610), a course is determined. At step 630, a course object is updated to reflect the location and course of the position locating device 505. After determining an origin location and course, processor 510 then determines entrance and exit points relative to the origin (step 410).

The process of FIG. 6 illustrates finding a position and populating a course object for one position. As a position of the origin changes, the process is repeated as necessary to maintain the relevant position and course of the origin.

In one embodiment, the course object may assume no course at all if, for example, the car is parked or the user does not care which way the car is moving.

In that case, all ways to leave the origin are considered equally valid. It is possible to have an embodiment with no course object al all, just the origin (or destination) position.

Figure 7:
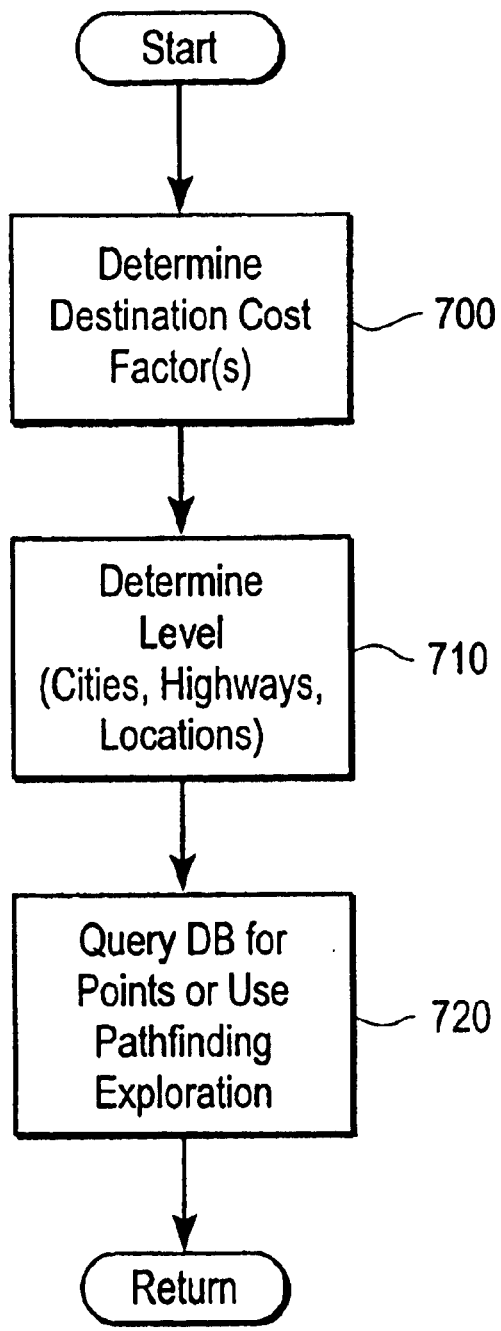
FIG. 7 is a flow diagram illustrating steps for determining entrance and exit points in one embodiment of the present invention.

FIG. 7 illustrates a flow of one embodiment of the present invention for determining entrance and exit points. At steps 700–710, preliminary entrance/exit point matters are determined. At step 700, cost factors for each of destinations is determined. Step 700 is basically a determination of an amount of cost that may be expended in reaching a destination. For example, destinations may be selected from any destination within a predetermined, or preselected radius, of the origin, and involve a certain amount of dollar costs such as gasoline, tolls, etc. In this embodiment, destination cost factors will be a limiting parameter on a search of database 520 for potential destination points. More information about cost zones can be found in U.S. Pat. No. 5,729,458.

The database 520, in addition to including mapping and routing information (a directed graph, for example), may also include information and statistics (statistical information) on points of interest and other well known destinations (cities or parks, for example) and entrance and exit points utilized in traveling to those destinations. This statistical information can be utilized to help find appropriate entrance and exit points. Alternatively, the database may maintain a listing of all entrance and exit points, and the cost factors determined in step 700 may be utilized only in finding entrance and exit points within the cost factors determined. The database may be stored in any media, including, but not limited to hard disk drives, optical disks, memory, flash devices, or any type of computer readable storage device.

At step 710 a predetermined, preselected or selected destination (or entrance/exit point) level (priority level) is determined. The priority level determines a scale of a map, or a priority of roads displayed or searched in the database. The priority level can be determined in any number of ways, either automatically or selected by a user. A default level may be utilized, or may be determined based on a current level that has been assigned to a road or course on which the user or position locating device 505 is currently located or proceeding.

Alternatively, the priority level may be automatically determined as one or two levels above a level of a current road or path (or any level above a current road or path). Each of step 700 and step 710 may require database (or memory) access, for example, once a current location is determined from the origin device, that location may be utilized to query the database 520 to determine a level of a current road or path on which the position locating device is currently locating. Step 710 may also be performed in conjunction with report results step 440 in determining an amount of detail to be displayed when a map style report is made.

Once the preliminary destination cost factors and priority level are determined, the database 520 is then queried for points matching the criteria to be searched. Each matching point is either an entrance point, an exit point or a destination relative to the origin (step 720). In one embodiment, entrance and exit points are associated with a tile (such as those taught in U.S. Pat. No. 5,916,299, described above). Another way to find entrances and exits is to start pathfinding exploration from the origin and store the important decision points and other important points reached within a specified path cost)which may be infinite). We can determine important decision points, base road priorities, or an a computational method such as discussed in U.S. patent application Ser. No. 09/208,709, "Shortcut Generator," filed Dec. 10, 1998, incorporated herein by reference. Other important points can be a rock at a city limit, for example, in case the user wants to find a path to a city, but not necessarily to a particular point within the city. In another embodiment, entrance and exit points are simply major road intersections, highway and freeway entrances and exits or other high volume routes that are ordinarily utilized in travel. A destination would be any particularly likely travel stop or destination located within a predetermined cost, or radius of the origin. Any method or process for searching or matching may be utilized to find points that match the search criteria.

After determining the entrance/exit points, the processor 510 then computes a path based on the origin and each of the entrance/exit points or destinations. The determination of paths may include multiple accesses to database 520 or alternatively data associated with each of the entrance/exit points and destinations may have been loaded into a memory 525, for example (alternatively, an entire portion of the database corresponding to the origin may have been loaded into memory 525, by processor 510). If a pathfinding exploration was used to determine the entrances and exits, then paths to the destinations are known.

Figure 8:
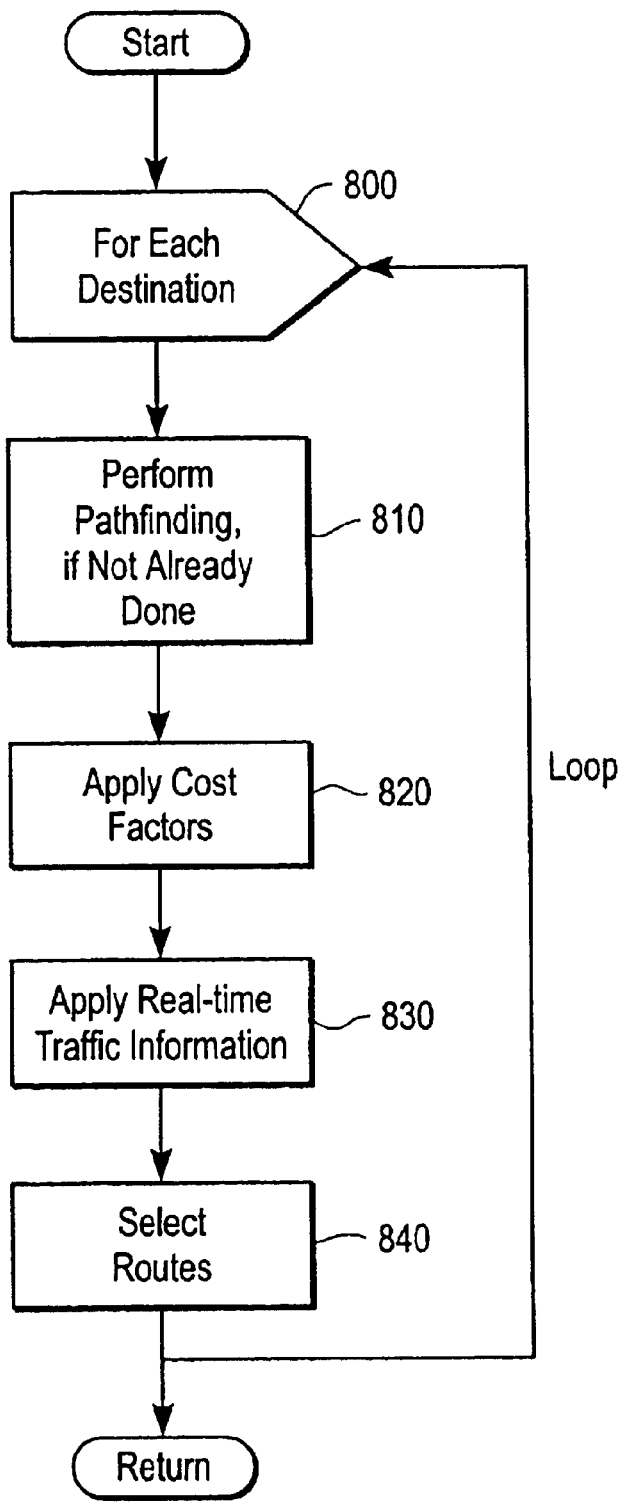
FIG. 8 is a flow diagram illustrating steps for determining paths in one embodiment of the present invention.

FIG. 8 illustrates a flow diagram for determining paths. Step 800 sets up a loop for performing the following steps for each destination (and/or entrance/exit point determined). At step 810, path finding is performed between the origin and a selected destination/entrance/exit point. In one embodiment, the path may already be determined in the process of obtaining the list of destination/entrance/exit points. Any method of path finding may be utilized, but a method for finding a least cost path is that which would generally be utilized. If least cost factors have not been applied in the pathfinding process, step 820 applies cost factors to each path to determine the least cost path. At step 830, real time traffic information is applied which may eliminate or alter a cost for any of the paths determined. At step 840 a route is selected from each of the paths determined (final selection based on cost factors, for example). Processor 510 then provides the determined entrance/exit points and/or destinations reporting them to display device 530 along with paths determined for each point. The above steps may be performed either in parallel (performing each step for each destination before proceeding), in series (performing each step for each destination), or by performing each step in groups of destinations. In a similar manner, reporting may be performed in parallel, series, etc.

In one embodiment, a shortcut procedure is utilized in addition to, or as a replacement for, the pathfinding step (810) in FIG. 8. One method of implementing a shortcut is described in Suranyi, U.S. patent application Ser. No. 09/208,709, entitled "SHORTCUT GENERATOR," filed Dec. 10, 1998, incorporated herein by reference, in its entirety.

Figure 9:
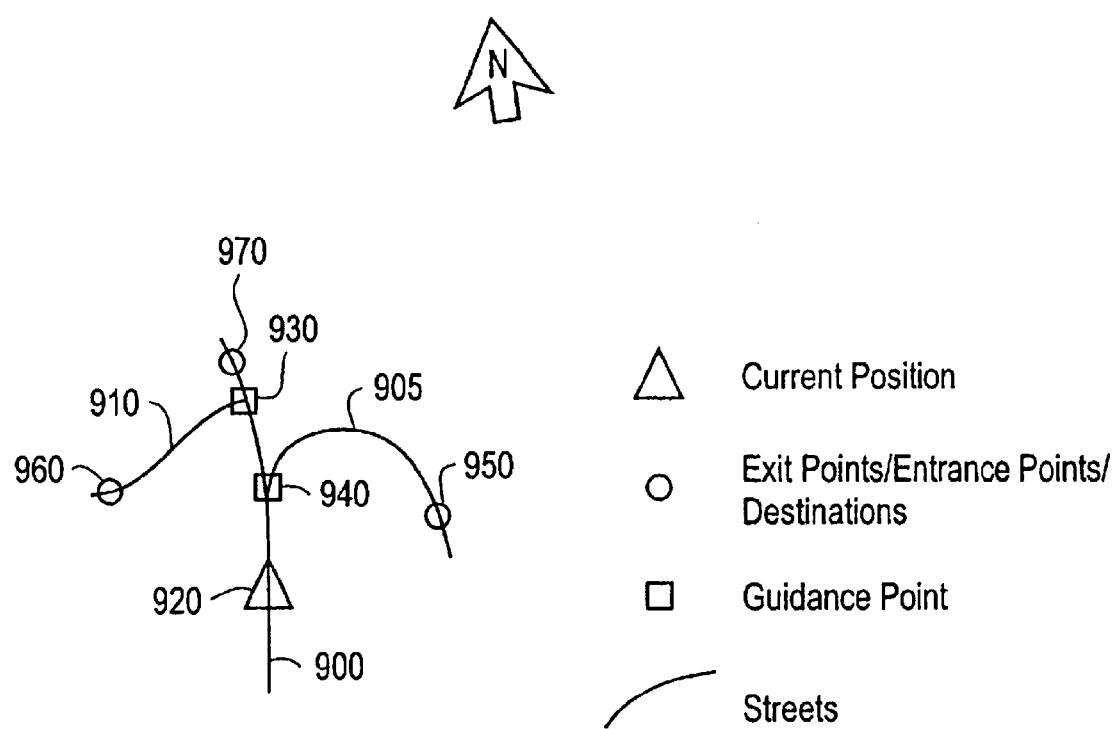
FIG. 9 is an illustration of streets, guidance points, and other information utilized in automatically generating driving guides in one embodiment of the present invention.

In one embodiment, before reporting results to the display device 530, processor 510 first determines whether or not a decision point has been reached by the user and/or the position locating device 505. A decision point is any point in which a user must make (or would likely need) a course correction (or information to stay on course) in order to reach any of the determined entrance/exit points and/or destinations. For example, FIG. 9 is a pictorial illustration of information stored in either database 520, memory 525, and utilized by processor 510, showing a current position of a user and/or a position locating device 505, entrance/exit points, guidance points (decision points and/or destinations), and streets on which a user is navigating. A current position of the user is shown as triangle 920 which indicates travel in a northerly direction on street 900. Intersecting street 900 at different points are each of streets 905 and 910. Street 905 has an exit point identified as 950, street 910 has an exit point identified as 960, and street 900 has a destination indicated as 970. The relevant decision points are indicated as guidance points 940 and 930, each of which correspond to points where the current street 900 intersect with each of streets 905 and 910 respectively. Therefore, if a user were intending exit point 950 as a near term or long term destination, directional indications or guidance would be required at or before decision point 940. Similarly, guidance information would be required at or before decision point 930 if a desired destination/entrance/exit point were exit point 960. If a desired destination were destination 970, guidance information may not be required but would be useful to a user at each of decision points 940 and 930.

Figure 10:
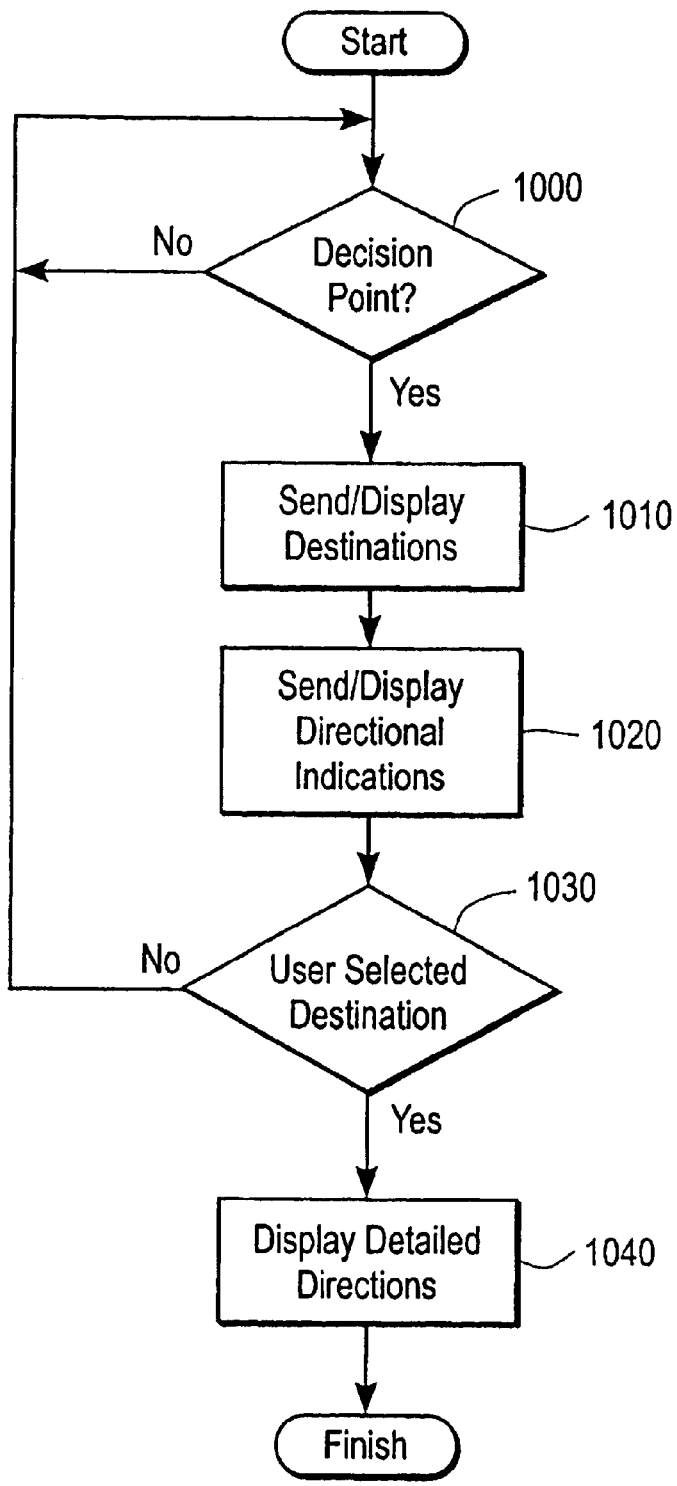
FIG. 10 is a flow diagram illustrating steps for reporting results in one embodiment of the present invention.

In one embodiment, the reporting of results (step 440) is illustrated in a flow diagram of FIG. 10. At step 1000, it is determined whether or not a user or a location of the automatic position locating device 505 is at or within a predetermined radius of a decision point. If the decision point has been reached, destinations are sent to or displayed on the display device 530 by processor 510 (step 1010). In addition, directional indications or directions are displayed in concert with the destinations (step 1020). In one embodiment, each of the destinations displayed are selectable, and at step 1030 processor 510 determines whether or not a user has selected any of the destinations. If a user has selected a destination, at step 1040, a detailed description, map or display of directions to that destination is displayed. The displayed 530 can be any of a conventional cathode ray tube (CRT), liquid display (LCD), or other reporting mechanism.

Figure 11:
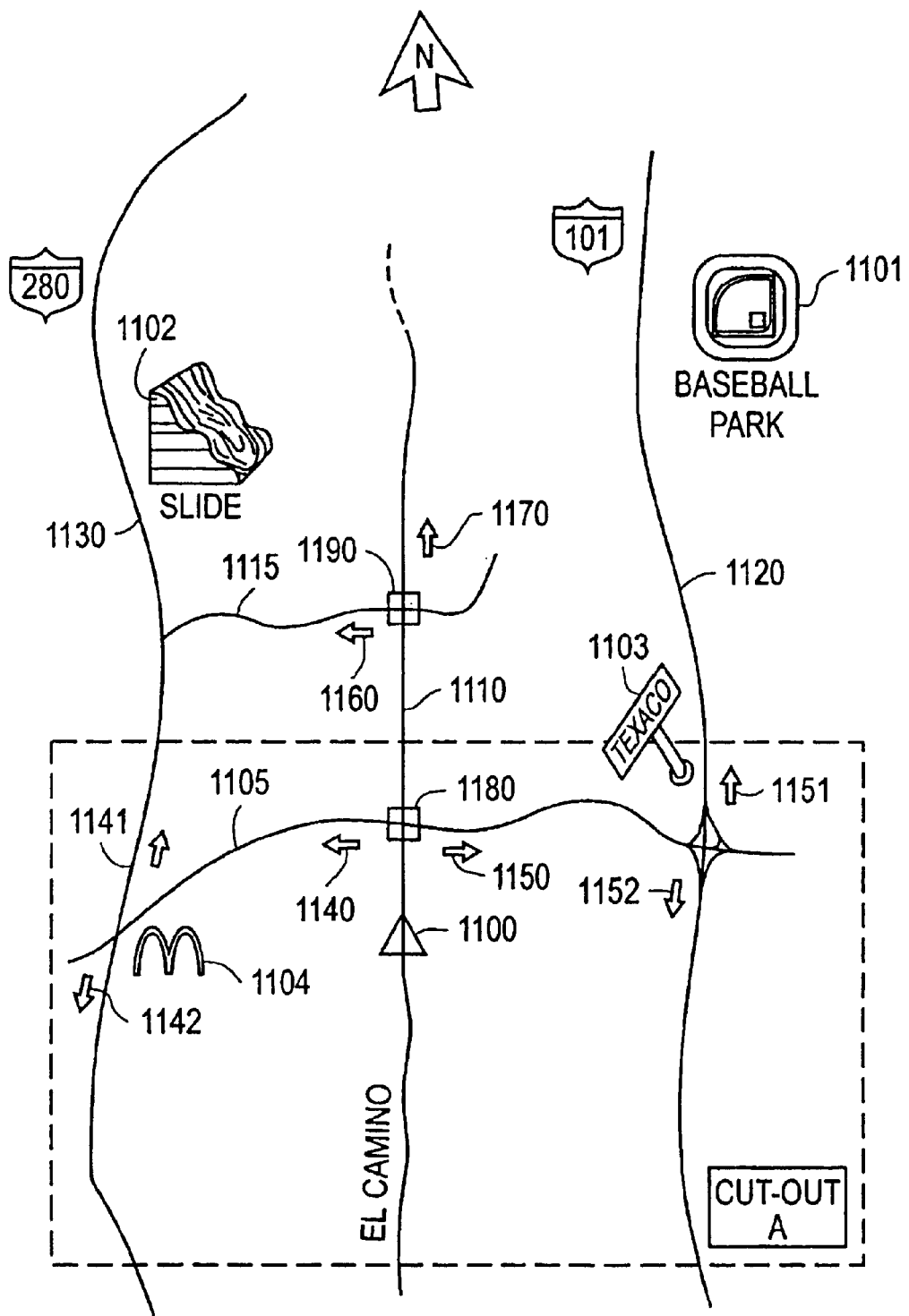
FIG. 11 is an example output display including a map showing major routes and driving indications according to the present invention.

FIG. 11 illustrates an example display, in one embodiment, of reporting results (a report) for the present invention. A user 1100 (also the origin in this example) is shown traveling in a northerly direction on street 1110 (El Camino). A search of the database reveals entrance points to highways 280 and 101 (1130, and 1120 respectively) in a close proximity of user 1100. Path finding is performed between the user 1100 in each of entrance points to highway 280 and 101 are performed. Decision points 1180 and 1190 are determined as points where a user would need to alter course in order to arrive at either of the entrance points (note, in this case that two entrance points to highway 280 have been located and one exit point to highway 101 has been located).

A large-scale map, such as the entire FIG. 11 (in one embodiment, notations for each of decision points 1180 and 1190 are not displayed) may be displayed to the user. Alternatively, a limited view shown as cut out A by the dotted line in FIG. 11 may be displayed. Displays of certain levels for user views can be performed consistent to that disclosed in U.S. Pat. No. 4,914,605 (which teaches various ways of displaying a level of streets, eliminating less important streets and also any confusion that may result from additional streets shown). By displaying a predetermined level of streets, only streets needed for directions may be provided, or streets to a level of detail determined to provide the most efficient information to the user.

As the user approaches decision point 1180 the display shows a current route of the user (El Camino, 1110) and an intersecting street 1105 which connects to each of highways 280 and 101 (1130 and 1120 respectively). Directional indicator 1140 indicates a left turn from the users present position onto street 1105 for highway 280. Directional indicators 1141 and 1142 indicate turns for entering highway 280 north and 280 south respectively. Directional indicator 1150 illustrates a right turn for user 1140 onto street 1105 for highway 101, and directional indicators 1151 and 1152 required for either of highway 101 north and 101 south respectively. FIG. 11 shows the directional indicators as arrows. In one embodiment, the directional indicators would include text in or near the arrow displaying the destination (e.g. highway 280) associated with the directional indicator. If a user passes street 1105, a next decision point 1190 is displayed showing intersecting street 1115 intersecting El Camino 1110. At this decision point directional indicators 1160 and 1170 show directions for highway 280 and El Camino respectively.

In one embodiment, between decision points 1180 and 1190, the display would simply indicate continuing on course (El Camino in this example) until the user 1100 reaches a predetermined proximity of the decision point 1190. Also, driving-related information such as traffic data may be selectively displayed that are on the calculated path, 1105, 1110, 1150, etc. that will choose relevant information for the driver. For example, high-density traffic areas may be displayed in red, traffic jams may be flashing red, or have a Ø (do not enter type) symbol, traffic icons, or other identifiers signaling traffic problems. The traffic problems identified could be any problem, slow traffic, accident, ice conditions, construction, etc. Separate signals for each type of problem, or groupings of problems under a "class" symbol, or a common traffic problem symbol, icon, or other identifier for all traffic incidents and conditions may be utilized.

The embodiments described with reference to FIG. 11 may also include landmarks output on any of the large scale map or cut-out A. A ball park 1101, fun slide 1102, prominent Texaco® (gas station) sign 1103, and a McDonald's® (dining facility) restaurant 1104 are illustrated. The landmarks are selected for visibility to provide reference for a driver to get his/her bearings (as aids to navigation), and/or to show locations of likely destinations. Any criteria maybe implemented for selecting landmarks to be displayed, and may be modulated via a user profile that provides criteria for how many or what type of landmarks are to be displayed, as discussed herein.

In addition to a map display, results may be in tabular form as illustrated in FIG. 12. In FIG. 12, a column 1200 lists each of exit points/entrance points/destinations determined relative to user 1100 and column 1250 is a listing of directional indicators corresponding to each of the items in column 1200. Columns 1200 and 1250 would be displayed to user 1100 within a predetermined proximity of decision point 1180 and illustrates right turns for each of highway 101 south and north, and left turns for each of highways 280 south and 280 north, and directional indicators for each of El Camino north and south. Tabular results illustrated in FIG. 12 are described by the present invention as a "highway sign" display, which provides the basic, most important, information required by a user within a proximity of decision point 1180. This information includes a listing of likely or potential destination/exit point/entrance points, and directional indications to those destinations/exit/entrance points at a decision point relative to the origin (decision point 1180, in this example).

In one embodiment, a display of the invention will utilize the highway sign format to display directions to major freeways. For example, along the San Francisco Peninsula and most of Silicon Valley, highways 101 and 280 are used daily by most travelers in the area. When traveling in this area, the invention would simply display "Highway 101," "Highway 280," and arrows linked to each highway pointing in the relevant directions toward those freeways at all intersections.

In one embodiment, destinations linked to a level of road currently being traveled on or higher are displayed. For example, if on an arterial road, destinations linked to arterial roads and highways are displayed. In another example, if on an highway, a list of highway linked destinations is provided, but do not list arterial linked destinations. Some destinations may be linked to more than one level of road (highways and an arterial, for example). Any of the listed destinations may be selected via a selection mechanism, and a detailed display and/or directions provided. In the event a large number of destinations is provided, a scrolling mechanism may be implemented (touch or voice activated list bar, automatic scroll, etc) to allow the user to view any one or all the possible selections, and select one or more destinations.

FIG. 13 illustrates a city level of the highway sign display in another embodiment of the display (tabular form) of the present invention. Column 1300 is a listing of cities and/or major destinations within a predetermined proximity of a user and/or a position locating device 505 (origin). In one embodiment, included in the destination listing 1300 are icons to graphically illustrate any features of the listed destinations (airplane icon 1305, for example). Column 1310 provides directional indicators to each of the listed destinations. In this example a right turn is required to reach SFO, either a right turn or a left turn to reach San Francisco, no indicators are provided for Menlo Park, which, in this example, is the location of the user, a right turn for Sunnyvale, and a right turn for SJC.

In one embodiment, landmarks are also displayed. For example, landmarks such as a river, a stadium, or any prominent object, building, or natural feature that maybe utilized as a navigational aid (landmarks may also be destinations). In FIG. 13, example landmarks (L) of a Fun Center® (amusement center), and a prominent Texaco® sign are illustrated, relative directions where a user would look to view the landmark may also be provided.

Arrows are utilized in each of FIGS. 12 and 13 as directional indicators, however, any mode of indication may be utilized such as "left turn", "right turn", arrows, or other indicators may be utilized (audio indicators, for example). Column 1320 provides additional information such as a distance from the current origin to each respective destination.

FIG. 14A illustrates an expanded "highway sign" directional indicators for a freeway traveler. The display of FIG. 14A is at a level that shows each of exit points from a freeway being traveled by a user. Column 1400 lists each exit and or major city associated with each exit of the freeway on which the user is traveling. Column 1410 illustrates a mileage to that particular exit and/or city, and a directional indicator includes either a forward mark, 1412, for example, indicating that the exit and/or city is further along the freeway in a direction being traveled by the user, and a reverse indicator, 1414, for example, indicating that the user has passed the particular exit and that exit/city is now behind the user. Column 1420 lists information regarding each of the exits/cities, services for example available at each exit/city. Column 1420, in this embodiment, utilizes graphic symbols for conveying this information, however, other modes of conveying this information may be utilized.

FIG. 14B illustrates another example of an output for a highway (titled "Highway 101"), including descriptive headings and points of interest indications. Points of interest may be included in a specific column (right hand column, for example), or placed in other locations in reference to an exit, city or other item displayed on the output.

Figure 15:
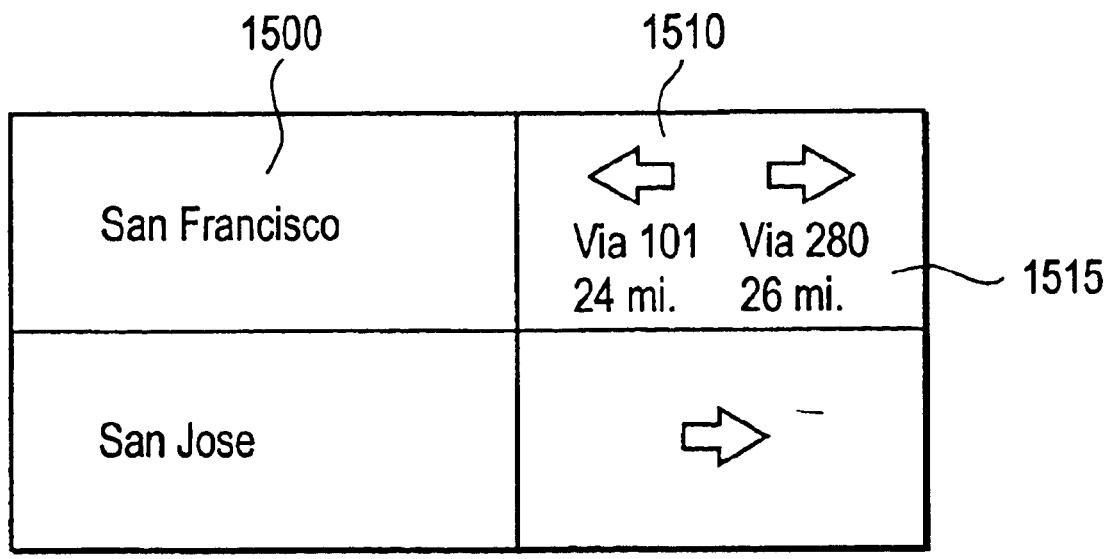
FIG. 15 is a fifth example output of a navigational device set up for only major destinations according to the present invention.

FIG. 15 illustrates a simplified version of the "highway sign" display according to the present invention. In this simplified view, only major destinations within a predetermined distance of the origin are displayed. In this case, San Francisco and San Jose are selected as major destinations. Column 1500 lists the destinations and column 1510 provides a directional indicator thereto. The directional indicators display a direction of a specific link in a path determined (via pathfinding, for example). In other embodiments, directions and/or directional indicators are provided for more than one link in the same display. In addition, in one embodiment, additional direction hints or tips may be included with the directional indicators in column 1510 and may include distances, freeways, or other relevant data. Hints or tips are particularly useful when ambiguous directions are provided because of different routes available to a same destination (via different freeways, for example). In this example hints 1515 provide relevant information as to freeway and distances of two different routes to the general destination of San Francisco.

As with each of the previous displays columns 1500 and 1510 would be displayed at a relative position before reaching a decision point for which those directions/ directional indicators would be relevant. One notable exception to this general rule would be the highway traveler "highway sign" illustrated in FIG. 14A (for example) which, in one embodiment, is a continual display and updated either continuously or at a predetermined interval (time or distance, for example). The same may be applied to other embodiments described herein.

Figure 16:
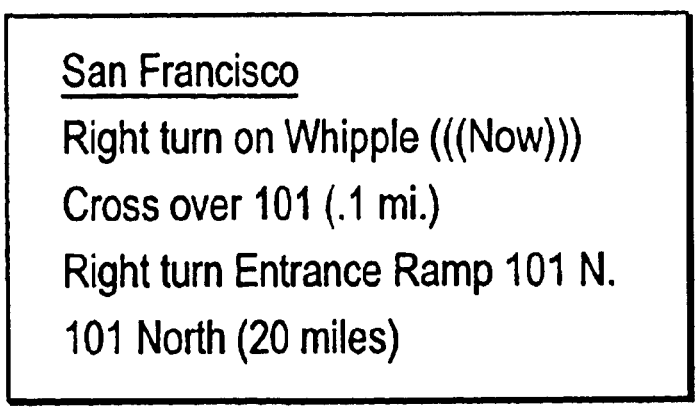
FIG. 16 is an example output display of detailed directions for a user selected destination.

In one embodiment, a display of the present invention includes an input device which allows a user to select any of the displayed destinations (San Francisco, or San Jose from FIG. 15, for example). The user input mechanism could be any of a keyboard, mouse, touch screen, or other input device which allows the user to input a desired destination. For example, using the display of FIG. 15 a user may touch on San Francisco (the first item in column 1500) to indicate San Francisco as a desired destination from the determined entrance/exit/destination points. In this case, FIG. 16 illustrates detailed directions that would then be displayed to the user. FIG. 16 illustrates written instructions on how to proceed from the current origin to San Francisco. In this case the user may have touched on the right arrow or left arrow indicator of column 1510 associated with San Francisco to provide the directions indicated. Alternatively, the user may have only pressed on San Francisco and if more than one path had been determined for San Francisco, the processor 510 would then perform a selection process to select (randomly or based on other factors, cost for example) which route to display in detailed directions.

Figure 17:
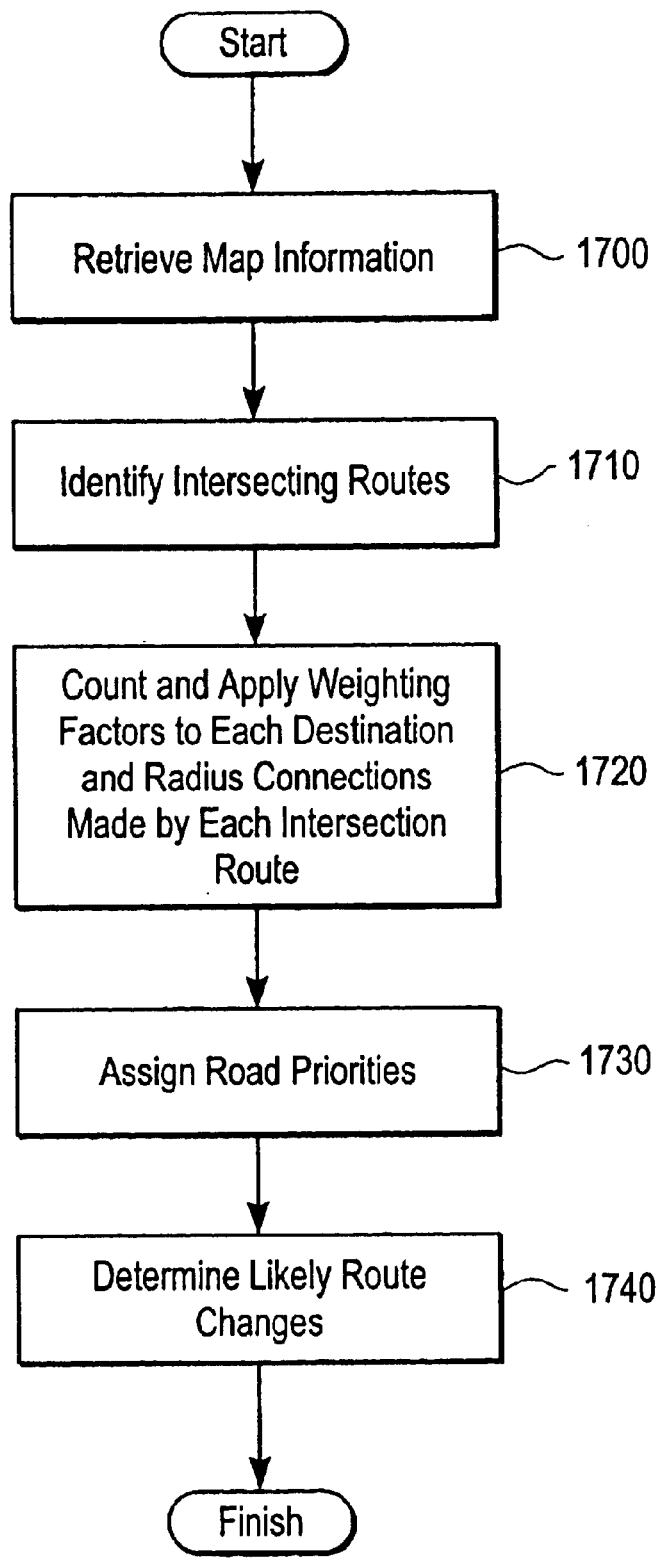
FIG. 17 is a flow diagram for a method for determining a priority of roads according to one embodiment of the present invention.

The present invention includes methods for determining the priority level of roads and the likelihood of a selected destination being an intended destination of a user of the present invention. One method for determining a priority level of roads is illustrated in the flow diagram of FIG. 17. At step 1700 map information is retrieved from the database for a predetermined radius of the origin.

Figure 18:
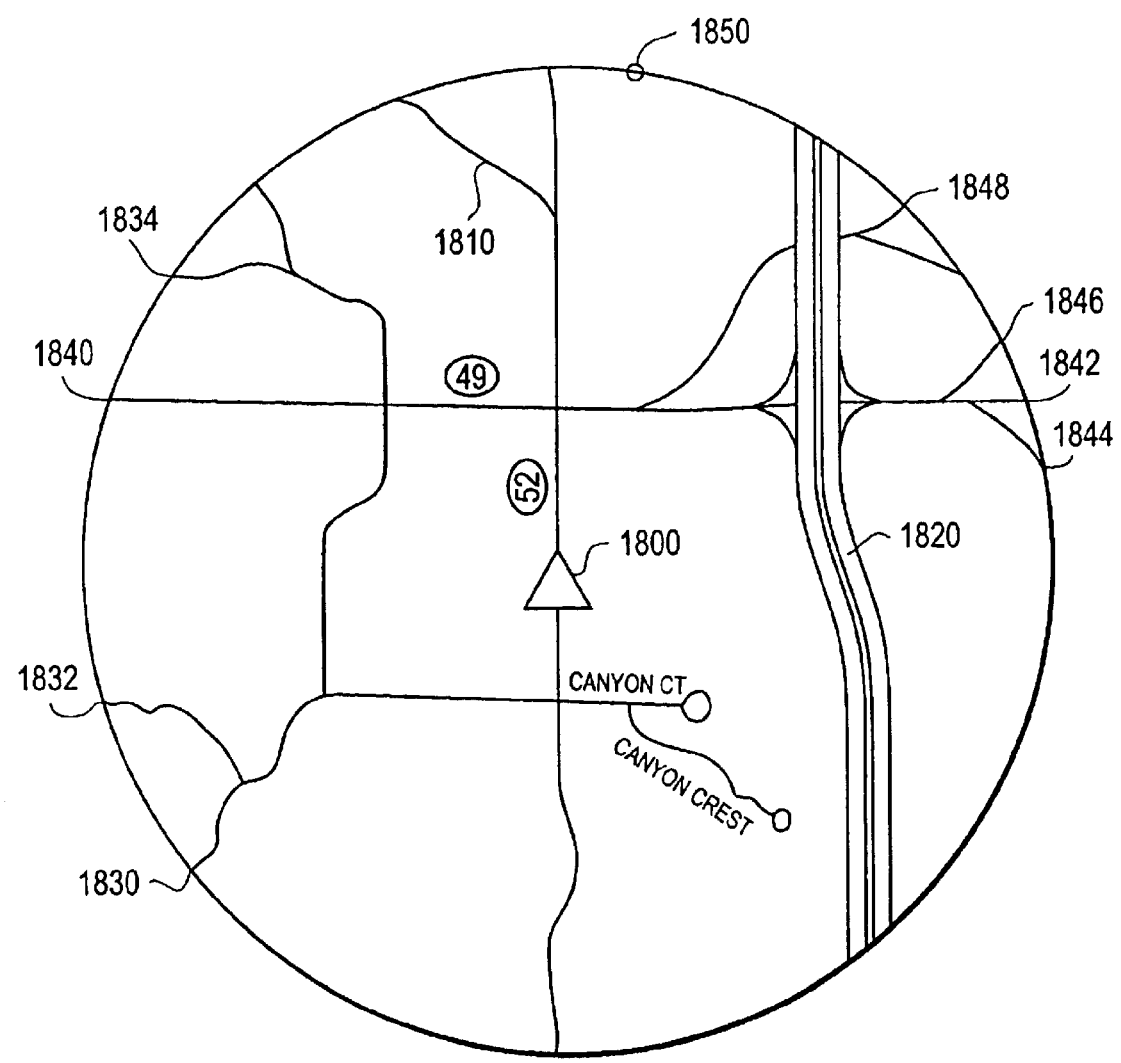
FIG. 18 is an illustration for depicting an exemplar method for determining a priority of roads.

An example pictorial representation of map information retrieved from a predetermined radius of an origin 1800 is illustrated in FIG. 18. FIG. 18 shows an origin 1800 on a route 52 that intersects with each of an arterial road 1810, route 49, and Canyon Ct., all within a radius 1850 of the origin. Each of routes 49 and Canyon Ct. are illustrated as intersecting with or branching out into further arterials. One of the arterials branching off of route 49 is in fact a high priority road, or freeway 1820.

At step 1710 routes intersecting a route of the user (origin 1800) are identified. A priority level of each of the intersecting routes is determined. The priority of each intersecting route maybe determinedly any number of methods including, determining a number of destinations that may be reached from each of the intersecting routes, increasing priority of each intersecting route if a destination is flagged as a high priority destination (a destination where it is niore likely to be a user's final destination based on any number of criteria. Number of visitors per year, for example). For example, San Francisco, or Disneyland® (amusement park), or an airport, would be more likely destinations and routes intersecting with those destinations would have a higher priority than a small grocery store five miles from the nearest freeway.

Another example of how priority of routes may be determined is by counting a number of intersections that occur on arterials connecting that route to the radius of the map information retrieved in step 1700 (the idea being that the more the sections of the outer radius that can be achieved by arterials increase the importance of that particular road having those arterials). A point system may be utilized that assigns points if an intersecting road connects to the radius, additional points if an arterial of the intersecting road connects the radius, and high priority road points if the intersecting road connects to a high priority road, such as a freeway.

For example, in FIG. 18, Canyon Ct. intersects with route 52 (a current course of origin 1800). Canyon Ct. connects to radius 1850 at point 1830, thus Canyon Ct. would get 5 points, for example, for connecting to the radius. Canyon Ct. would receive additional points for arterials that connect to the radius at 1832 and 1834 (1 pt. each for example), for a total of 7 points. Route 49, would get 16 points for connecting to radius 1850 at each of 1840, 1842, and arterial connections 1844, 1846, and 1848. Route 49 would get high priority road point for connecting with freeway 1820 (30 points, for example), for a total of 46 points for route 49. In this manner the priority of intersecting roads could be determined, and navigational directions. In a similar manner, points can be assigned based on priority destinations which each of intersecting route or arterials connect to.

Many other methods for determining priority may be utilized. The priority could be determined on the fly (at the time priorities need to be determined by a navigational device, for example), or may be precalculated and stored in the database along with the navigational data (included with directed graph data, for example).

At step 1730 the priority determined for each road is assigned, and at step 1740 the most likely road turns or directional changes are indicated by the report results in step 440. Other methods of determining and assigning a priority of roads within a proximity of the origin 1800 or within the entire database may be utilized.

In one embodiment, use of priorities is particularly useful. A driver may simply need directions to 101, and provide "Just get me to 101 North, and I'll be fine," as an input The input may be made via any of keyboard, touch screen, trackball, and other manual input methods, or a speech recognition unit may capture and recognize the spoken words and extract the relevant general destination (101 North, in this example, a waypath). Given a high priority to reach the general destination, if the user is already on an arterial or less important highway, only one or two levels of route planning need to be performed.

Figure 19:
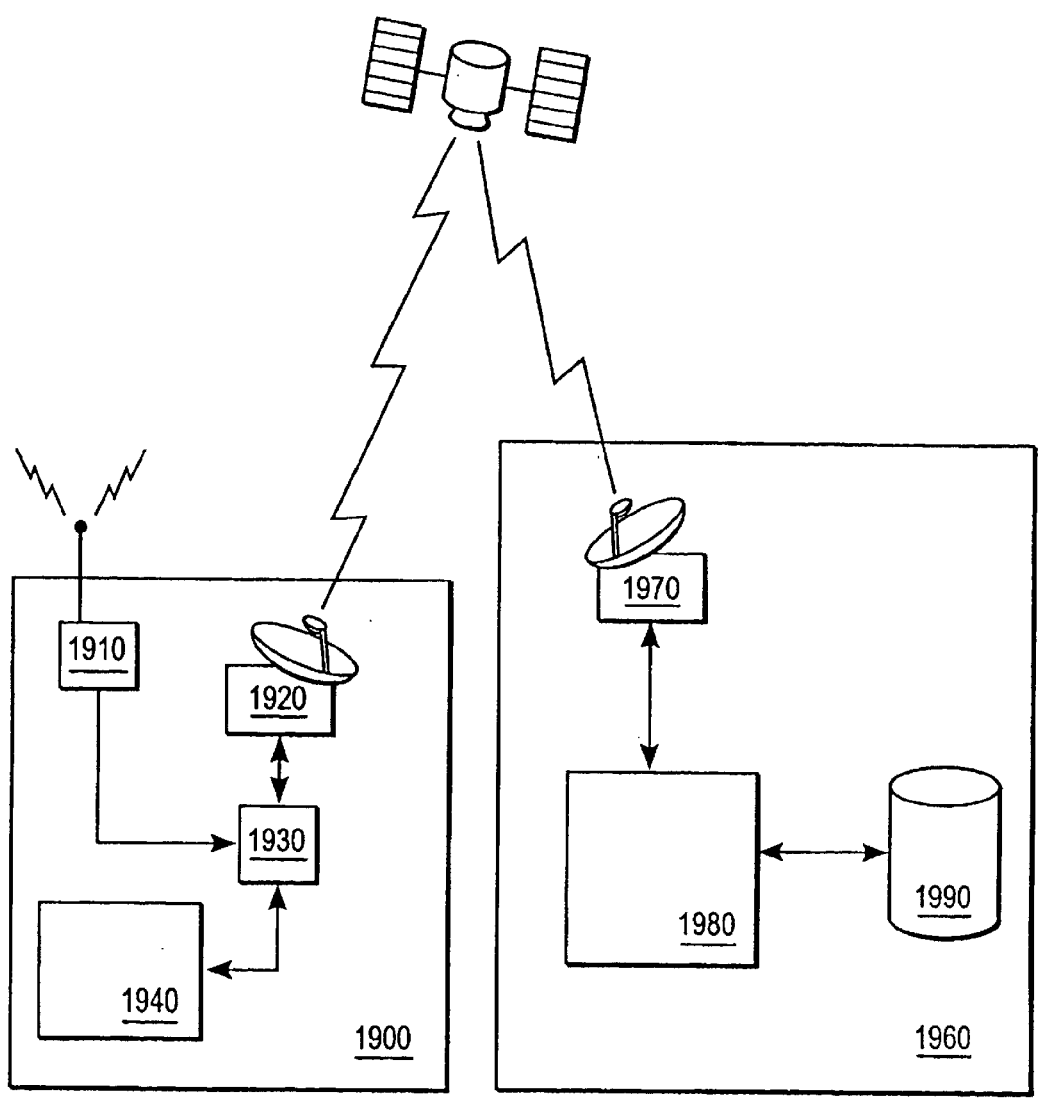
FIG. 19 is a block diagram illustrating an alternative configuration of components configured to perform the processes of the present invention.

FIG. 19 illustrates an alternative configuration of components configured to perform the processes of the present invention. In FIG. 19 a device 1900 which is intended to be installed in an automobile or other vehicle (boat, truck, or RV, for example), a hand-held device, or other portable electronic device. The device 1900 has a position location identifier 1910, a processor 1930, a communications device 1920, and a display mechanism 1940. The position location mechanism 1900 is a one of a vehicle navigation unit (similar to the one discussed in U.S. Pat. No. 4,796,191, for example), GPS, Loran, RDF, or other device that is capable of determining a location of the device 1900. The location of the device is readable by processor 1930 which then communicates the location to the communications mechanism 1920 for broadcast of that location to be received by a main device 1960.

The main device 1960 includes a communication mechanism 1970 that receives communications from at least one device 1900 and communicates a location of each respective device 1900 to a main processor 1980. The main processor 1980 communicates with a database 1990 containing map information for areas surrounding each of the devices 1900 and calculates directions as discussed above for each device. Once calculated, the directions are then communicated to communication device 1970 which are then broadcast to each of the devices 1900 (It is conceived that directions for a specific device 1900 are broadcast to or received/processed only by that specific device 1900, however, each device 1900 may, in other embodiments, receive all broadcasts and determine which broadcast applies to the specific device via an addressing code or other identification mechanism).

The device 1900 receives the communications from the main device 1960 via the communications device 1920 which are then provided to the processing unit 1930. The processing unit 1930 then formats the display information for display or reporting on reporting mechanism 1940.

The reporting mechanism 1940 can be any of a CRT, LCD, and/or touch screen. As discussed above, user inputs provided relative to the reported results (in this embodiment, inputs provided via the reporting mechanism 1940) are communicated back to the processor 1930 which then either formats additional data previously received from the main device 1960 having detailed directions, or sends an additional request to the device 1960 to receive detailed instructions. In either case, the detailed instructions are then displayed by processor 1930 on the reporting mechanism 1940.

As will be appreciated by those of ordinary skill in the art, the present invention may be configured by any number of basic overall configurations, FIGS. 5 and 19 illustrating two example configurations. Utilizing the basic configuration of FIG. 19 (separate main unit and remote units devices), FIG. 20 illustrates several alternative embodiments of the present invention.

Figure 20:
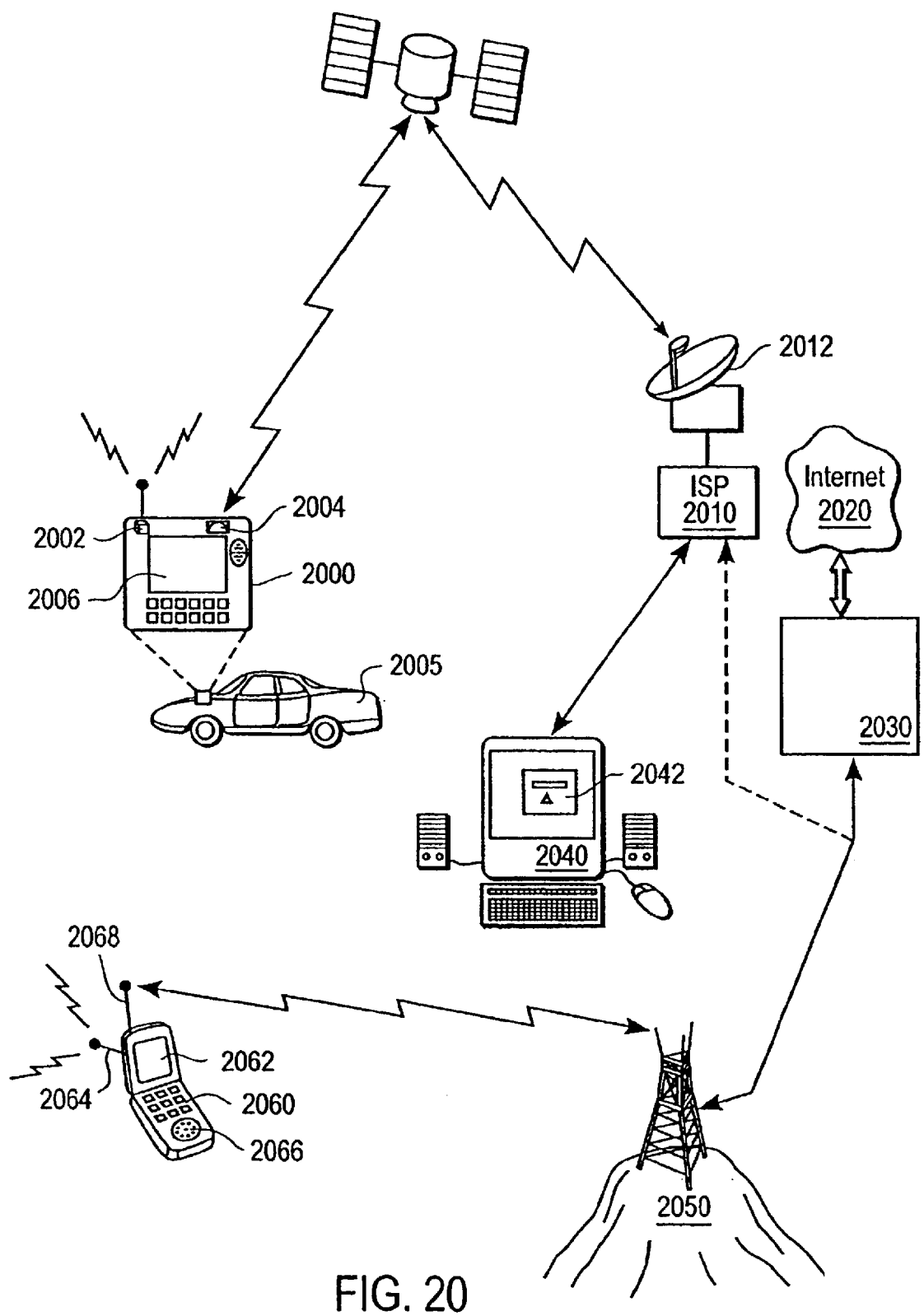
FIG. 20 is a diagram illustrating several embodiments of the present invention.

In FIG. 20, an automobile mounted device 2000, equivalent to device 1900, is mounted at a dashboard of an automobile 2005. The device 2000 includes an automatic position locating mechanism 2002 and a communications link 2004 to a satellite which communicates to a base communications device 2012 that connects the device 2000 to an Internet service provider 2010. The Internet service provider 2010 connects the device 2000 to the Internet 2020 having an attached server 2030. The server 2030 performs each of the functions of the main processing unit 1980 and includes a database of routing information (not shown) equivalent to either of 1990 or 520 as discussed previously.

Thus, the device 2000 accesses server 2030 (via a satellite communications link between 2004 and 2012, Internet service provider 2010, and Internet 2020) providing a position for determination of routing and/or directional information. The server 2030 then communicates (via a reverse path) the routing and/or directional information to the device 2000. The results are reported on a display screen 2006 as discussed above with respect to FIG. 19 or other embodiments previously discussed.

In another embodiment, a user of a computer 2040 is connected (via Internet service provider 2010 and the Internet 2020) to the directional server 2030. In this configuration, utilizing a web browser 2042, the user of computer 2040 provides an origin location to the server 2030 and receives directional information from the server 2030. The origin corresponding to the user of computer 2040 may be input via any of an automatic location device attached to the computer 2040 (not shown) or may be input via a standard dialogue or input box coded in any web browser compatible programming language (HTML or Java® (programming language), for example). Alternatively, a user of computer 2040 may invoke a program specifically developed to access server 2030 (rather than a web browser).

In yet another embodiment, the present invention may be configured within a portable hand-held device 260 for example. The hand-held portable device 260 may be any of a palm sized computer, laptop portable computer, cellular telephone, or other devices. The portable hand-held device 260 includes at least one of a display 2062, a speaker 2060 (optional), or other reporting mechanism. In this embodiment, the hand-held or portable device 260 also includes an automatic position location mechanism 2064 that determines a position which is provided to a processing unit (not shown) which communicates that position, via an attached communications device and antenna 2068, to a control tower 2050 (cellular control tower for example). The control tower 2050 then communicates either directly with server 2030 or communicates with Internet service provider 2010 and then to the server 2030 via the Internet. The routing and/or directional information computed by the server 2030 is then returned via a reverse path to antenna 2068 and to the processing unit (not shown) which processes and reports the directional information onto one of the reporting mechanisms (either display 2062, speaker 2066, or other reporting mechanism). Alternatively, the device can perform all the processing locally (one example being a palm pilot with a snap-in GPS receiver).

In yet another embodiment, audio mechanisms are included on some of devices 2000 and 2040 also for alternative reporting of direction information via audio as opposed to a display. The audio may be presented to an output device in any form, including audio files of WAV, Microsoft® (proprietary) sound file, MP3, real audio, any streaming audio format, and other audio formats. The files themselves may be produced via stored pre-recordings, synthesized, or prepared using a text-to-speech generator. In addition, both audio and visual displays may be utilized in reporting the directional information.

In each of the above embodiments, Internet 2020 may be replaced by any local area, wide area, or other network types. ISP 2010 may be replaced by any network connection mechanism. As will be appreciated by those of ordinary skill in the art, the above examples may be extended and rearranged into many different embodiments performing the same basic communication and processing functions.

Figure 21A:
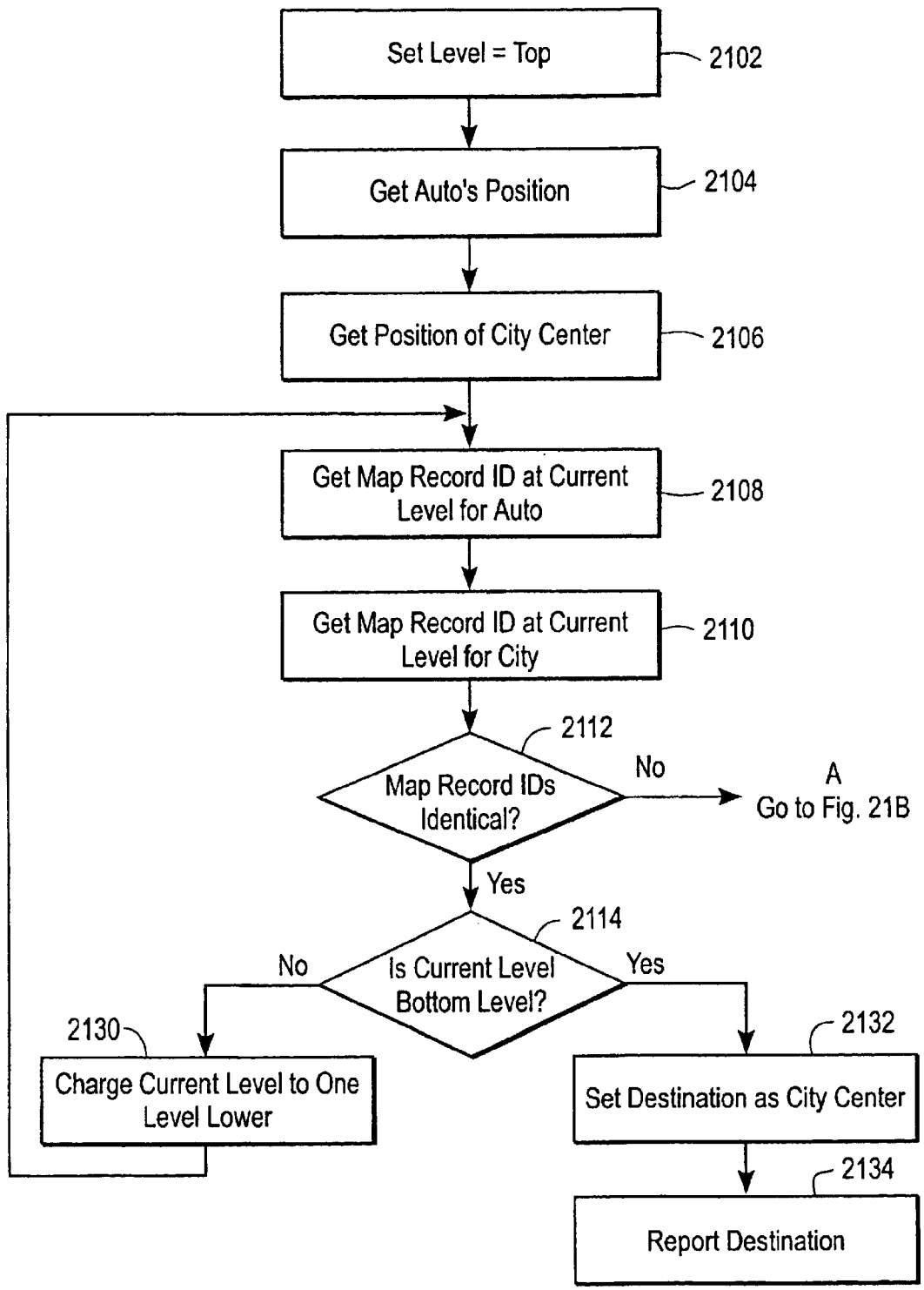
FIGS. 21A and 21B are flow charts depicting an embodiment for determining a set of one or more destinations.
Figure 21B:
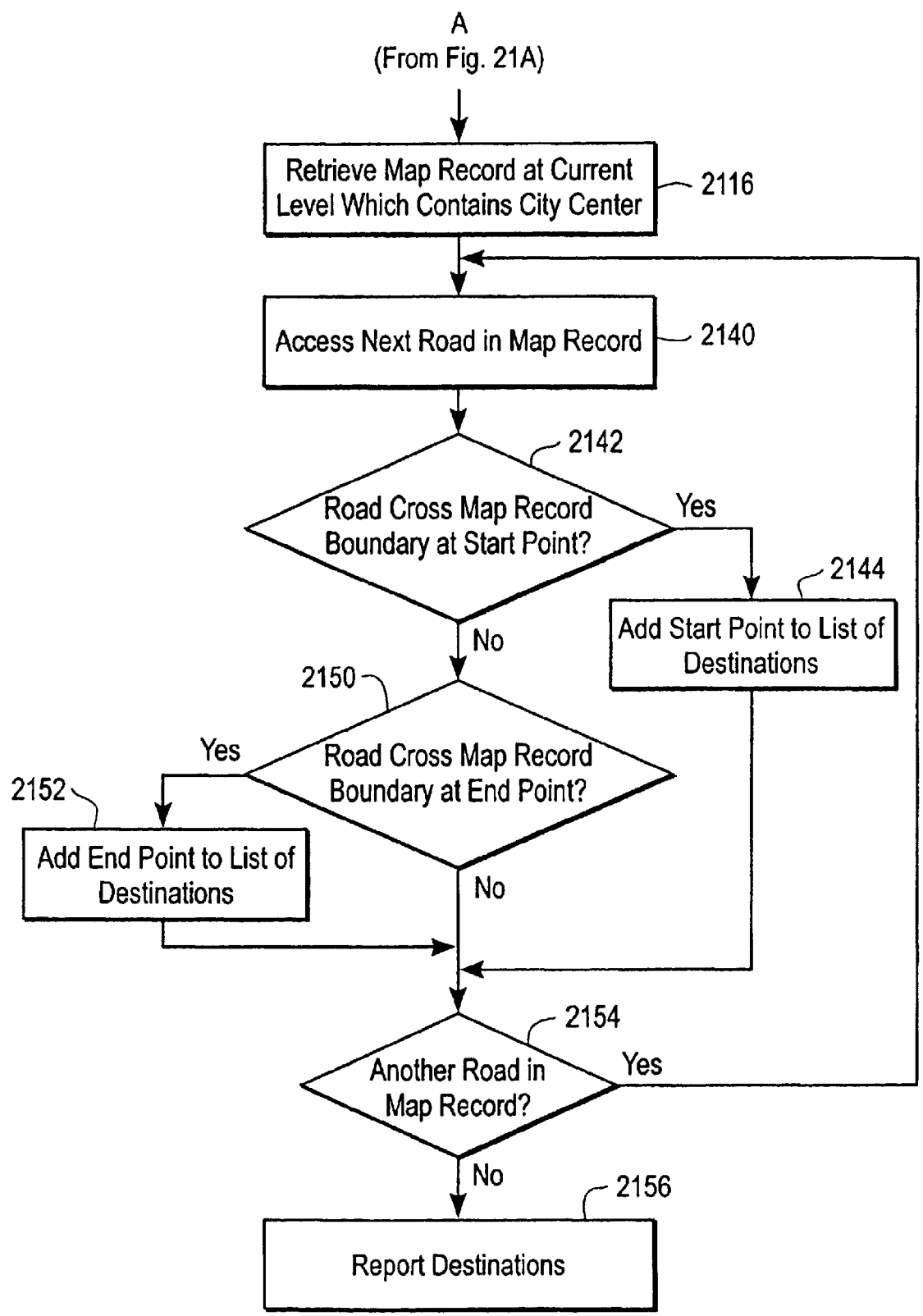

FIGS. 21A and 21B depict another embodiment for determining a set of destinations. Before describing the specific steps of FIGS. 21A & B, it is useful to provide some background information.

A digital map database is composed of map records. Each map record is a section in the database (in the computer memory or on a hard drive, etc.). Each map record represents a particular geographic area of the map, and contains information relevant to that area, such as the roads that go through it and the features within it (such as parks, lakes, cities, etc.) There are several levels of map records. These levels are called "generalization levels". The whole map is covered by each of these generalization levels, so that if there were 3 generalization levels (0, 1, and 2) then all generalization level 0 records, put together, would cover the entire map, and the same would be true for generalization level 1 records and for generalization level 2 records. To put it another way, every geographic location on the map is included within three map records: one at each generalization level. Because the lower generalization level records include more information, they are generally smaller than higher level records. Usually the highest generalization level (2, in this example) consists of exactly one record, which covers the whole map. That's not strictly necessary for the present invention, however. The difference between the generalization levels involves the amount of information contained within them. That is, the lowest generalization level records contain all the map information. The next higher records do not include some of the least important information (e.g. less important streets, small parks). Each successively higher level includes successively less and less information, so that at the top generalization level only the very important roads and features are included. Given any location on the map as, e.g. a latitude and longitude, we can find which map records contain that point, at all generalization levels. Every map record has an ID, which is often the offset to the start of the record within the map database file.

A road within a map record is expressed in the following way. First, there is some general information about the road, such as its type and use, its name, etc. Then there is a set of point records which each contain one geographic point (e.g. a latitude/longitude pair). Connecting these points together by a line would draw this road on a screen, for example. For the purpose of this invention, we can assume that part of the general information included for a road is information about whether the road crosses the map record boundary. That is, there are two bits in the general information: "start point crosses boundary" and "end point crosses boundary". Each bit is 0 or 1, depending on whether or not the point in question is on the map record boundary. Given a particular map record, one can retrieve all the roads within that record and examine or use them. For example, we can display them on a screen, or we can check which roads cross the map record boundary, etc.

A process for determining destinations for use with the present invention is depicted in FIGS. 21A and 21B. In step 2102, the system sets the current generalization level to be the top level. In step 2104, the car's position (lat/lon) is obtained. In step 2106, the position of the city center (lataon) is obtained. In step 2108, the map record ID at the current generalization level for the auto is obtained. In step 2110, the map record ID at the current generalization level for the city center is obtained. If the map record IDs for the auto (step 2108) and for the city (step 2110) are identical (step 2112), then it is determined in step 2114 whether the current generalization level is the lowest level. If the map record IDs are not identical, the method loops to step 2116.

If the current generalization level is the bottom level (step 2114), then set the city center to be a destination (step 2132) and report that destination in step 2134. In this case, the auto and the city are in the same map record even at the bottom level, so it makes sense to just use the city center as the destination. If the current generalization level is not the bottom level (step 2114), then the current generalization level is changed to the next lower level and the method loops to step 2108.

In step 2116, the system retrieves the map record at the current generalization level which contains the city center. In step 2140, the process accesses the next road in the map record retrieved in step 2116. In step 2142, the system determines whether the road under consideration crosses the map record boundary at its start point. If so, the start point is added to the list of destinations in step 2144. If not, the method continues with step 2150.

In step 2150, the system determined whether the road under consideration crosses the map record boundary at its end point? If so, the end point is added to the list of destinations in step 2152. If not (an after steps 2152 and 2144), the method continues with step 2154.

In step 2154, the system determines whether there are any more roads in the map record that have not been considered yet. If there are more roads to consider, then the method loops to step 2140; otherwise, the list of destinations are reported in step 2156.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, retrieving location position information, determining entrance points, exit point, or other destinations, pathfinding between an origin and any number of other locations (exit points, entrance points, and destinations, for example), determination of decision (or guidance) points, and the display, storage, or communication of results according to the processes of the present invention.

The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed and desired to be secured by Letters Patent of the United States is:

1. A method, comprising the steps of:
    receiving information indicating an origin;
    determining a set of at least one general destination without receiving an indication of a specific destination;
    computing directional information between said origin and each general destination; and
    reporting said directional information.

2. The method according to claim 1, wherein said general destinations are at least one of cities, waypoints, waypaths, and other general destinations.

3. The method according to claim 1, wherein said step of determining a set of at least one general destination comprises:
    accessing a set of general destinations from a database;
    prioritizing the accessed general destinations based on data making it more probable or less probable that each accessed general destination is a destination or waypoint of a user of said method.

4. The method according to claim 3, wherein said step of prioritizing includes prioritizing the accessed general destinations based on priority criteria, including at least one of:
    landmark filters that assign a value to landmarks based on predetermined criteria;
    distance of said user from a general destination;
    metrics, including at least one of capacity of the general destination, popularity of the general destination, size of the general destination, and other metrics describing the general destinations;
    history of past travels of said user to the same or similar types of general destinations; and
    contact listings and other data stored connecting said user to each general destination.

5. The method according to claim 4, wherein said step of prioritizing, includes the step of retrieving at least part of said priority criteria from an external data source.

6. The method according to claim 5, wherein said external data source comprises at least one of a laptop computer, a handheld computer, a data source attached to a device performing said method via an Internet or other data communications channel.

7. The method according to claim 1, further comprising the step of:
    selecting driving information corresponding to the computed directional information;
    wherein said step of reporting includes reporting the selected driving information.

8. The method according to claim 1, wherein said step of reporting comprises the step of:

dividing said directional information into regions each corresponding to a decision point; and reporting said directional information by region, when said origin is within a predetermined radius of a corresponding decision point.

9. The method according to claim 8, wherein said step of reporting directional information by region comprises the steps of:

determining a decision point closest to said origin; and reporting parts of said directional information needed for navigation when said origin is within a close proximity of said closest decision point.

10. The method according to claim 1, wherein said step of reporting comprises the step of:

displaying said directional information in a basic highway sign format.

11. The method according to claim 10, wherein said highway sign format only includes at least one destination and a mileage designation to at least one of said destinations.

12. The method according to claim 10, wherein said highway sign format only includes at least one destination and at least one directional indication associated with at least one of said destinations.

13. The method according to claim 12, wherein said highway sign format further includes a mileage designation to at least one of said destinations.

14. The method according to claim 10, wherein said step of displaying includes the step of:

displaying icons associated with a destination in close proximity to the associated destination, said icons identifying services, attributes, or features of the associated destination.

15. The method according to claim 1, wherein said step of reporting comprises the steps of:

displaying at least one destination in a selectable format;

receiving a destination selected by a user; and displaying detailed directional information corresponding to the selected destination.

16. The method according to claim 15, wherein said selectable format includes at least one of:

a touch selectable format, a voice selectable format, a web browser selectable format, and any of pushbutton, trackball, mouse, and keyboard selectable formats.

17. The method according to claim 15, wherein said step of receiving a destination comprises the step of:

receiving at least one of an audible selection, a touch selection, a dialog box selection, a pushbutton, trackball, mouse, and keyboard selection elicited by said step of displaying at least one destination.

18. The method according to claim 1, wherein said step of reporting comprises the steps of:

displaying a map of an area within a predetermined proximity of said origin; and placing directional indicators on said map indicating any of routes and partial routes to each of said destinations.

19. The method according to claim 18, wherein said step of reporting further comprises the step of:

identifying a location and current travel direction of said origin.

20. The method according to claim 18, wherein said step of reporting further comprises the step of:

identifying a location and current travel direction of said origin;

wherein said origin represents a location of a vehicle.

21. The method according to claim 18, wherein said step of displaying a map comprises the step of:

displaying said map at a level at or above a level of a road currently being traveled at said origin.

22. The method according to claim 1, wherein said step of reporting comprises the steps of:

formatting an audio file having said directional information; and playing said audio file to a user.

23. The method according to claim 22, wherein said audio file is in at least one of .WAV, Microsoft® sound file, MP3, real audio, a streaming audio format, and other audio formats.

24. The method according to claim 22, wherein said audio file is prepared using a text-to-speech generator.

25. The method according to claim 1, wherein said step of reporting comprises the steps of:

performing a text-to-speech conversion of the directional information computed; and playing the converted speech.

26. The method according to claim 1, wherein said step of reporting comprises the step of:

writing said directional information to a file.

27. The method according to claim 26, wherein said file is at least one of ASCII, HTML, VRML, Excel®, Quattro Pro®, Microsoft Word®, WordPerfect®, and other application readable formats.

28. The method according to claim 26, wherein said step of reporting further comprises the step of:

sending said file over a network to a client device.

29. The method according to claim 28, wherein said network comprises at least one of an intranet, LAN, WAN, a telephony based communication medium, a satellite based communications medium, the Internet, and World Wide Web.

30. The method according to claim 28, wherein said client device comprises at least one of a portable computing device, including any of notebook or palm pilot type computing devices, a cellular phone, and a navigation device.

31. The method according to claim 1, wherein said step of reporting comprises the step of displaying said directional information on a display of a device.

32. The method according to claim 31, wherein said device is one of a computer, a notebook computer, a palm pilot type device, a cellular phone, a hand-held navigation device, and a vehicle mounted navigation device.

33. The method according to claim 1, wherein said step of reporting includes the step of sending audio information representing said directional information to one of a cellular phone, a computer, a notebook computer, a palm pilot type device, a hand-held navigation device, and a vehicle mounted navigation device.

34. The method according to claim 1, wherein said step of reporting comprises the step of:

reporting said directional information continuously.

35. The method according to claim 1, wherein said step of computing directional information comprises at least one of:

applying a route determination method to data corresponding to at least said origin and each of said destinations; and formatting results of said route determination method as said directional information.

36. The method according to claim 35, wherein said route determination method is at least one of pathfinding, an application of Dijkstra's algorithm, and other route determination methods applied to said data.

37. The method according to claim 35, wherein said data is a directed graph having nodes and links representing each of streets, highways, and other navigable roads within a predetermined radius of said origin.

38. The method according to claim 37, wherein said data is stored in a database and then loaded into a memory for application of said route determination method.

39. The method according to claim 35, further comprising the steps of:
   determining decision points associated with said directional information; and
   displaying said directional information in close proximity to said decision points.

40. The method according to claim 1, further comprising the step of:
   determining decision points associated with said directional information.

41. The method according to claim 1, wherein said step of computing directional information comprises the steps of:
   identifying an origin tile associated with said origin and a set of at least one destination tiles associated with each of said destinations; and
   performing a route determination method between said origin and each of said destinations located in a same tile as said origin tile.

42. The method according to claim 41, wherein said step of computing directional information further comprises the step of:
   formatting results of said route determination method as said directional information.

43. The method according to claim 41, wherein said route determination method comprises at least one of pathfinding, an application of Dikjstra's algorithm, and other route determination methods.

44. The method according to claim 41, wherein said step of computing directional information further comprises the steps of:
   performing an origin/exit point route determination method between said origin and each exit point located in a same tile as said origin tile;
   looking up routing information between the origin tile and a tile associated with each destination not in the same tile as said origin tile; and
   performing an entrance point/destination route determination method between entrance points of each destination tile and each destination in the destination tiles;
   selecting a best route or partial route from results of each of said origin/exit point route determination, said routing information looked up, and said entrance point/destination route determination; and
   formatting the selected best route or partial route as said directional information.

45. The method according to claim 1, wherein said step of determining a set of at least one destination comprises the step of:
   retrieving at least one destination from a database.

46. The method according to claim 45, wherein said step of retrieving at least one destination comprises the step of:
   retrieving destinations from said database that are within a predetermined cost of said origin.

47. The method according to claim 45, wherein said step of retrieving at least one destination comprises the step of:
   retrieving destinations from said database having a predetermined amount of importance relative to other destinations in said database.

48. The method according to claim 47, wherein importance of the determined destinations is based on at least one of yearly traffic volume, seasonal traffic volume, daily traffic volume, traffic volume during a same time frame that said method is being performed, radius from said origin, population of a city, value of a landmark, capacity of routes to the retrieved destinations, and any available traffic information.

49. The method according to claim 48, wherein said daily traffic volume corresponds to a similar day of the week that said method is being performed.

50. The method according to claim 45, further comprising the step of:
   excluding destinations having less than a predetermined historical traffic volume on a same day, time, or season as at least one of a day, time, or season that said method is being performed, or is indicated by a user of said method.

51. The method according to claim 46, wherein said predetermined cost is at least one of estimated travel time, distance, travel expenses, or a level corresponding to said origin.

52. The method according to claim 45, wherein said destinations are at least one of routes intersecting a route being traversed by a user at said origin, and entrance points and exit points selected from a pre-calculated set of entrance points and exit points stored in said database.

53. The method according to claim 1, wherein said destinations include at least one of freeways, highways, streets, and other routes.

54. The method according to claim 1, further comprising the step of:
   prioritizing each destination based on an evaluation criteria.

55. The method according to claim 54, wherein said evaluation criteria comprises at least one of a traffic volume associated with each destination, and a number or volume of connections that can be made by a route intersecting a route being traversed by said origin.

56. The method according to claim 1, wherein said step of determining a set of at least one destination comprises the step of:
   calculating at least one entrance point or one exit point from data contained in a database.

57. The method according to claim 45, wherein said step of retrieving destinations, comprises the step of:
   retrieving an identification of tiles within a predetermined cost of a tile containing said origin.

58. The method according to claim 57, further comprising the step of:
   selecting retrieved tiles as destinations based on at least one of average yearly travel volumes, seasonal travel volumes, and weekday/weekend travel volumes associated with the retrieved tiles.

59. The method according to claim 1, further comprising the steps of:
   prioritizing the determined destinations; and
   eliminating destinations not reaching a predetermined prioritization level.

60. The method according to claim 59, wherein said step of prioritizing includes the step of:
   reading a user profile that identifies a priority of types of destinations; and
   prioritizing the determined destinations based on a type of each destination and a priority level of each destination type in said user profile.

61. The method according to claim 59, further comprising the steps of:
   displaying a user profile in a user modifiable interface; and
   storing priorities of destination types based on user inputs to the user-modifiable interface.

62. The method according to claim 45, further comprising the steps of:
  prioritizing the retrieved destinations; and
  eliminating destinations not reaching a predetermined prioritization level.

63. The method according to claim 45, further comprising the steps of:
  receiving a selection of at least one of said destinations retrieved; and
  reporting specific directional information corresponding to each of the selected destinations.

64. The method according to claim 63, further comprising the step of repeating said steps of receiving and reporting after said origin changes position.

65. The method according to claim 63, wherein said step of receiving a selection comprises the steps of:
  reporting a set of at least one of said destinations; and
  receiving an indication from a user of the selected destinations.

66. The method according to claim 65, wherein said step of reporting a set of at least one of said destinations comprises:
  sending at least one of a web based communication to a client web browser, a computer readable communication to a client computer, and a transmission readable by a remote wireless device.

67. The method according to claim 1, wherein said step of determining a set of at least one destination comprises the steps of:
  locating a tile corresponding to said origin; and
  retrieving exit points and destinations associated with said tile corresponding to said origin.

68. The method according to claim 1, wherein said step of determining a set of at least one destination comprises the steps of:
  receiving a user communication identifying at least one class of destinations; and
  retrieving exit points, entrance points, and destinations associated with said at least one class of destinations.

69. The method according to claim 68, wherein said at least one class of destinations is chosen from a list including any of gas stations, repair facilities, hospitals, banks, ATM machines, shopping malls, grocery stores, convenience stores, other store types, restaurants, highway entrances and exits, cities, parking lots, mass transit stations, campgrounds, public restrooms, government buildings, police stations, call boxes, public telephones, schools, libraries, points of interest, tourist attractions, stadiums, or any other type of classifiable location.

70. The method according to claim 69, further comprising the steps of:
  prioritizing said class of destinations; and
  eliminating destinations not reaching a predetermined prioritization level.

71. The method according to claim 1, wherein said step of receiving information comprises the step of:
  receiving data from a position locating device indicating a location of said origin.

72. The method according to claim 71, wherein said step of receiving data is performed at any one of a predetermined interval and after the location of said origin changes.

73. The method according to claim 1, wherein said step of receiving information comprises the step of:
  reading a file having information identifying a location of said origin stored therein.

74. The method according to claim 1, wherein said step of receiving information comprises the step of:
  receiving a communication from a user containing a location of said origin.

75. The method according to claim 1, wherein said step of receiving information comprises the steps of:
  sending a query to one of a user and a position-locating device; and
  receiving a response to said query having information indicating a location of said origin.

76. The method according to claim 75, wherein:
  said step of sending a query to a user comprises the step of sending an Internet communication to said user; and
  said step of receiving a response to said query comprises the step of receiving an Internet communication from said user.

77. The method according to claim 76, wherein said Internet communication sent to said user comprises at least one of an HTML formatted document, a Java® language applet, or other Internet browser compatible communication.

78. The method according to claim 77, wherein said Internet communication includes data for placing one of a dialog box, question line, and other query mechanism at a display screen of said user.

79. The method according to claim 76, wherein said step of receiving a response comprises the step of:
  receiving a response formatted according to information included in said Internet communication sent to said user.

80. The method according to claim 75, wherein said step of receiving a response comprises the step of:
  receiving an audible response from said user having information indicating said origin.

81. The method according to claim 1, wherein said method is performed by a one of a navigation device and a position-locating device.

82. The method according to claim 1, wherein said method is performed on at least one of a computing device, a portable computing device, a hand-held computing device, a palm pilot type device, a navigation device, and a cellular phone.

83. The method according to claim 1, wherein said step of determining a set of at least one general destination includes identifying roads in proximity to a city center.

84. The method according to claim 1, wherein said step of determining a set of at least one general destination includes the steps of:
  identifying a map record that includes a city center and does not include a current location;
  identifying roads in said map record that cross a boundary of said map record; and
  reporting said roads as destinations.

85. The method according to claim 1, wherein said step of determining a set of at least one general destination includes the steps of:
  set a generalization level as a top level;
  acquiring position of an auto and of a city center;
  acquiring a first map record ID for said auto;
  acquiring a second map record ID for said city center;
  determining whether said first map record ID is identical to said second map record ID;
  reporting said city center as a destination if said first map record ID is identical to said second map record ID said generalization level is a lowest level;
  decreasing said generalization level if said first map record ID is identical to said second map record ID and said generalization level is not a lowest level;

retrieving a map record for said city center if said first map record ID is not identical to said second map record ID;

identifying roads in said map record that cross a boundary of said map record; and reporting said roads as destinations.

86. One or more processor readable storage devices having processor readable code embodied on said processor readable storage devices, said processor readable code for programming a processor to perform a method comprising the steps of:

receiving information indicating an origin;

determining a set of at least one destination without receiving an indication of a specific destination;

computing directional information between said origin and each destination; and reporting said directional information.

87. One or more processor readable storage devices according to claim 86, wherein said step of determining a set of at least one general destination includes the steps of:

identifying a map record that includes a city center and does not include a current location;

identifying roads in said map record that cross a boundary of said map record; and reporting said roads as destinations.

88. One or more processor readable storage devices according to claim 86, wherein said set of at least one destination includes one of a final destination and a waypoint to a destination.

89. One or more processor readable storage devices according to claim 86, wherein said step of reporting directional information by region comprises the steps of:

determining a decision point closest to said origin; and reporting parts of said directional information needed for navigation when said origin is within a close proximity of said closest decision point.

90. One or more processor readable storage devices according to claim 86, wherein said step of reporting directional information by region comprises the steps of:

determining a decision point closest to said origin; and continuously reporting directional information needed for navigation from said origin to said closest decision point.

91. One or more processor readable storage devices according to claim 86, wherein said step of reporting comprises the step of:

displaying said directional information in a basic highway sign format.

92. One or more processor readable storage devices according to claim 91, wherein said highway sign format only includes at least one destination and at least one directional indication associated with at least one of said destinations.

93. One or more processor readable storage devices according to claim 86, wherein said step of reporting comprises the steps of:

displaying at least one destination in a selectable format;

receiving a destination selected by amuser; and displaying detailed directional information corresponding to the selected destination.

94. One or more processor readable storage devices according to claim 86, wherein said step of reporting comprises the steps of:

displaying a map of an area within a predetermined proximity of said origin; and placing directional indicators on said map indicating any of routes and partial routes to each of said destinations.

95. One or more processor readable storage devices according to claim 94, wherein said step of reporting further comprises the step of:

identifying a location and current travel direction of said origin on said map.

96. One or more processor readable storage devices according to claim 86, wherein said computer is one of a portable computer, a laptop computer, a palm computer, a cellular phone, and a navigation device.

97. One or more processor readable storage devices according to claim 86, wherein said step of computing directional information comprises at least one step of:

applying a route determination method to data corresponding to at least said origin and each of said destinations; and formatting results of said route determination method as said directional information.

98. One or more processor readable storage devices according to claim 86, wherein said destinations are any one of a final destinations and waypoints between said origin and said final destination.

99. One or more processor readable storage devices according to claim 98, wherein said route determination method is at least one of pathfinding, an application of Dikjstra's algorithm, and other route determination methods applied to said data.

100. One or more processor readable storage devices according to claim 86, wherein said step of computing directional information comprises the steps of:

identifying a origin tile associated with said origin and a set of at least one destination tiles associated with each of said destinations; and performing a route determination method between said origin and each of said destinations located in a same tile as said origin tile.

101. One or more processor readable storage devices according to claim 100, wherein said step of computing directional information further comprises the steps of:

performing an origin/exit point route determination method between said origin and each of exit points located in a same tile as said origin tile;

looking up routing information between the origin tile and a tile associated with each destination not in the same tile as said origin tile; and performing a entrance point/destination route determination method between entrance points of each destination tile and each destination in the destination tiles;

selecting a best route from results of each of said origin/exit point route determination, said routing information looked up, and said entrance point/destination route determination; and formatting the selected route as said directional information.

102. One or more processor readable storage devices according to claim 86, wherein said step of determining a set of at least one destination comprises the step of:

retrieving destinations from a database that are within a predetermined cost of said origin.

103. One or more processor readable storage devices according to claim 102, wherein said step of determining a set of at least one destination further comprises the steps of:

reading a user profile providing importance data regarding said destinations; and modulating the retrieved destinations by any of at least ranking elimination based on the user profile.

104. One or more processor readable storage devices according to claim 102, further comprising the step of:
excluding destinations having less than a predetermined historical traffic volume on a same day, time, or season as at least one of a day, time, or season that said method is being performed, or is indicated by a user of said method.

105. One or more processor readable storage devices according to claim 86, wherein said step of determining a set of at least one destination comprises the steps of:
locating a tile corresponding to said origin; and
retrieving exit points and destinations associated with said tile corresponding to said origin.

106. One or more processor readable storage devices according to claim 86, wherein said step of determining a set of at least one destination comprises the steps of:
receiving a user communication identifying at least one class of destinations; and
retrieving exit points, entrance points, and destinations associated with said at least one class of destinations.

107. One or more processor readable storage devices according to claim 106, wherein said at least one class of destinations is chosen from a list including any of gas stations, repair facilities, hospitals, banks, ATM machines, shopping malls, grocery stores, convenience stores, other store types, restaurants, highway entrances and exits, cities, parking lots, mass transit stations, campgrounds, public restrooms, government buildings, police stations, call boxes, public telephones, schools, libraries, points of interest, tourist attractions, stadiums, or any other type of classifiable location.

108. One or more processor readable storage devices according to claim 107, further comprising the step of ranking each destination at least in part based on a rank of each destination class.

109. One or more processor readable storage devices according to claim 86, wherein said step of receiving information comprises the step of:
receiving data from a position locating device indicating a location of said origin.

110. One or more processor readable storage devices according to claim 86, wherein said step of receiving information comprises the step of:
receiving a communication from a user containing a location of said origin.

111. One or more processor readable storage devices according to claim 86, wherein said step of receiving information comprises the steps of:
sending a query to a user; and
receiving a response to said query from said user having information indicating a location of said origin.

112. One or more processor readable storage devices according to claim 111, wherein:
said step of sending a query to a user comprises the step of sending an Internet communication to said user; and
said step of receiving a response to said query comprises the step of receiving an Internet communication from said user.

113. One or more processor readable storage devices according to claim 112, wherein said Internet communication sent to said user comprises at least one of an HTML formatted document, a Java® language applet, or other Internet browser compatible communication.

114. An apparatus for providing direction information, comprising:
an origin locator configured to determine a location of an origin;
a destination mechanism configured to determine a set of at least one destination without information regarding any specific destination;
a directions finding device configured to compute directional information from said origin to each of said destinations; and
a report mechanism configured to report the directional information computed.

115. The device according to claim 114, further comprising:
a decision point mechanism configured to determine at least one decision point closest to said origin;
wherein said report mechanism is further configured to report only parts of said directional information needed for navigation when said origin is within a close proximity of said closest decision point.

116. The device according to claim 115, wherein said close proximity is determined based on any of distance to and estimated time to said closest decision point.

117. The device according to claim 114, wherein:
said report mechanism is further configured to report said directional information in a basic highway sign format.

118. The device according to claim 117, wherein:
said highway sign format only includes at least one destination and at least one directional indication associated with at least one of said destinations.

119. The device according to claim 114, wherein:
said report mechanism includes,
a display device configured to display at least one destination in a selectable format,
a selection mechanism configured to receive a destination selected by a user, and
said report mechanism is further configured to display detailed directional information corresponding to the selected destination on said display device.

120. The device according to claim 114, wherein:
said reporting mechanism is further configured to report a map of an area within a predetermined proximity of said origin having directional indicators indicating routes to each of said destinations.

121. The device according to claim 114, wherein said direction finding device includes a direction component that performs at least one of pathfinding, an application of Dikjstra's algorithm, and other route determination methods applied to said origin and at least one of said destinations.

122. The device according to claim 114, wherein:
said destination mechanism includes,
a reception device configured to receive a user communication identifying at least one class of destinations, and
a destination identifier configured to retrieve exit points, entrance points, and destinations associated with said at least one class of destinations.

123. The device according to claim 122, wherein said at least one class of destinations is chosen from a list including any of gas stations, repair facilities, hospitals, banks, ATM machines, shopping malls, grocery stores, convenience stores, other store types, restaurants, highway entrances and exits, cities, parking lots, mass transit stations, campgrounds, public restrooms, government buildings, police stations, call boxes, public telephones, schools, libraries, points of interest, tourist attractions, stadiums, or any other type of classifiable location.

124. The device according to claim 114, wherein said origin locator comprises at least one of a Global Position System, Satellite Navigation System, Loran, Automatic Direction Finder, Radio Direction Finder, or other position finding mechanism.

125. The device according to claim 114, wherein:

said origin locator includes a reception device configured to receive a communication from a user containing a location of said origin.

126. The device according to claim 114, wherein:

said origin locator comprises a server configured to send a query to a user and receive a response to said query from said user.

127. The device according to claim 126, wherein said query and said response are Internet communications comprising at least one of an HTML formatted document, a Java language applet, or other Internet browser compatible communication.

128. The device according to claim 114, wherein said computer is one of a portable computer, a laptop computer, a palm computer, a cellular phone, and a navigation device.

129. The device according to claim 114, wherein said destination mechanism performs a method comprising the steps of:

identifying a map record that includes a city center and does not include a current location;

identifying roads in said map record that cross a boundary of said map record; and reporting said roads as destinations.

130. A method, comprising the steps of:

receiving information indicating a destination;

determining a set of two or more possible origins without receiving an indication of a specific origin;

computing directional information between said destination and each possible origin; and reporting said directional information.

131. A method according to claim 130, wherein:

said step of determining a set of two or more possible origins includes comparing a current location to a set of potential origins and selecting a subset of said potential origins which are closest to said current location.

132. A method according to claim 130, wherein:

said step of computing takes into account current traffic information.

133. A method according to claim 130, wherein:

said set of two or more possible origins includes a plurality of cities.

134. A method according to claim 130, wherein:

said set of two or more possible origins includes a plurality of roads.

\* \* \* \* \*

UNITED STATES PATENT AND TRADEMARK OFFICE
CERTIFICATE OF CORRECTION

PATENT NO. : 6,826,472 B1
DATED : November 30, 2004
INVENTOR(S) : Asao Kamei et al.

It is certified that error appears in the above-identified patent and that said Letters Patent is hereby corrected as shown below:

<u>Column 28,</u>
Line 63, replace "record ID said" with -- record ID and said --.

Signed and Sealed this

First Day of November, 2005

JON W. DUDAS
*Director of the United States Patent and Trademark Office*